United States Patent
Srinivasan et al.

(10) Patent No.: US 10,442,710 B2
(45) Date of Patent: Oct. 15, 2019

(54) POLYSACCHARIDE AGENTS AND METHODS OF THEIR USE FOR REMOVING SOLIDS FROM WATER

(71) Applicants: The Texas A&M University System, College Station, TX (US); Pristina Water LLC, San Anselmo, CA (US)

(72) Inventors: Rajani Srinivasan, Stephenville, TX (US); Anuradha Mishra, Greater Noida (IN); John McKinney, San Anselmo, CA (US)

(73) Assignees: Pristana Water LLC, San Anselmo, CA (US); The Texas A&M University System, College Station, TX (US)

( * ) Notice: Subject to any disclaimer, the term of this patent is extended or adjusted under 35 U.S.C. 154(b) by 0 days.

(21) Appl. No.: 15/949,925

(22) Filed: Apr. 10, 2018

(65) Prior Publication Data
US 2018/0230029 A1    Aug. 16, 2018

Related U.S. Application Data

(62) Division of application No. 14/555,448, filed on Nov. 26, 2014.

(60) Provisional application No. 61/909,864, filed on Nov. 27, 2013.

(51) Int. Cl.
| | | |
|---|---|---|
| *C02F 1/52* | (2006.01) | |
| *B01D 21/01* | (2006.01) | |
| *C02F 101/20* | (2006.01) | |
| *C02F 101/10* | (2006.01) | |
| *C02F 101/34* | (2006.01) | |
| *C02F 103/02* | (2006.01) | |
| *C02F 103/06* | (2006.01) | |

(Continued)

(52) U.S. Cl.
CPC ............ *C02F 1/5263* (2013.01); *B01D 21/01* (2013.01); *C02F 1/5272* (2013.01); *C02F 2101/10* (2013.01); *C02F 2101/20* (2013.01); *C02F 2103/02* (2013.01); *C02F 2103/06* (2013.01); *C02F 2103/30* (2013.01); *C02F 2103/34* (2013.01)

(58) Field of Classification Search
None
See application file for complete search history.

(56) References Cited

U.S. PATENT DOCUMENTS

| | | | |
|---|---|---|---|
| 6,899,891 B2 | 5/2005 | Siskind | |
| 2004/0232085 A1* | 11/2004 | Kang | C02F 11/12 210/728 |

(Continued)

FOREIGN PATENT DOCUMENTS

| | | | |
|---|---|---|---|
| WO | 02/094722 A1 | 11/2002 | |
| WO | WO-2012094967 A1 * | 7/2012 | ............ C02F 1/5263 |

OTHER PUBLICATIONS

Mishra et al. (Colloid Polym. Sci., 2003, 281, 164-167) (Year: 2003).*

(Continued)

*Primary Examiner* — Clare M Perrin
(74) *Attorney, Agent, or Firm* — Christensen O'Connor Johnson Kindness PLLC

(57) ABSTRACT

Polysaccharide agents for removing solids from an aqueous suspension and methods for using the polysaccharide agents to remove solids from an aqueous suspension.

17 Claims, 25 Drawing Sheets

(51) Int. Cl.
  *C02F 103/30*  (2006.01)
  *C02F 103/34*  (2006.01)

(56) References Cited

U.S. PATENT DOCUMENTS

| | | | | |
|---|---|---|---|---|
| 2008/0290029 | A1* | 11/2008 | Croue | B01J 20/26 210/638 |
| 2009/0098262 | A1* | 4/2009 | Mabille | A23L 2/78 426/422 |
| 2009/0272693 | A1* | 11/2009 | Mabille | B01J 20/26 210/683 |
| 2009/0321251 | A1* | 12/2009 | Rigby | C02F 1/4602 204/229.6 |
| 2013/0029905 | A1 | 1/2013 | Madhavamenon et al. | |
| 2013/0299433 | A1* | 11/2013 | Inagaki | C02F 1/5263 210/730 |

OTHER PUBLICATIONS

Mishra et al. (Chinese Journal of Polymer Science, 2008, 26, 679-687). (Year: 2008).*

Agarwal, M., et al., "Utilization of Okra Gum for Treatment of Tannery Effluent," International Journal of Polymeric Materials 52(11-12):1049-1057, Nov.-Dec. 2003, Abstract.

Mishra, A., et al., "Biodegradable Graft Copolymers of Fenugreek Mucilage and Polyacrylamide: A Renewable Reservoir to Biomaterials," Carbohydrate Polymers 65(1):58-63, Jul. 2006.

Mishra, A., et al., "Fenugreek Mucilage for Solid Removal From Tannery Effluent," Reactive & Functional Polymers 59(1):99-104, Apr. 2004.

Mishra, A., et al., "Flocculation of Textile Wastewater by Plantago psyllium Mucilage," Macromolecular Materials and Engineering 287(9):592-596, Sep. 2002.

Mishra, A., et al., "Tamarindus indica Mucilage and Its Acrylamide-Grafted Copolymer as Flocculants for Removal of Dyes," Colloid and Polymer Science 285(2):161-168, Nov. 2006.

Srinivasan, R., et al., "Fenugreek Mucilage as a Treatment Agent for Textile Wastewater," Proceedings of the 230th ACS National Meeting, Washington, D.C., Aug. 28-Sep. 1, 2005, 1-page abstract.

Srinivasan, R., et al., "Okra (*Hibiscus esculentus*) and Fenugreek (*Trigonella foenum graceum*) Mucilage: Characterization and Application as Flocculants for Textile Effluent Treatments," Chinese Journal of Polymer Science 26(6):679-687, Nov. 2008.

\* cited by examiner

US 10,442,710 B2

POLYSACCHARIDE AGENTS AND METHODS OF THEIR USE FOR REMOVING SOLIDS FROM WATER

CROSS-REFERENCES TO RELATED APPLICATIONS

This application is a division of U.S. patent application Ser. No. 14/555,448, filed Nov. 26, 2014, which claims the benefit of U.S. Patent Application No. 61/909,864, filed Nov. 27, 2013, each expressly incorporated herein by reference in its entirety.

BACKGROUND OF THE INVENTION

Water and wastewater treatment uses a combination of biological and chemical methods to separate solids, organic, inorganic pollutants, and pathogens from contaminated waters. The process is expensive in terms of time, energy, and resources. Materials which are faster in reaction, more efficient, cost effective, and eco-friendly are highly desirable.

With the changing scenario and limited supply of water, globally many industries need to treat their water and wastewater to remove toxic contaminants before discharging them to the surface water or as drinking water. To avoid further pollution to existing ecosystems, emphasis has been on using natural, non-toxic eco-friendly effective materials that are currently unavailable or scarce for water treatment processes. Industries and municipal plants are in search of eco-friendly, cost effective, and efficient natural flocculants.

A need exists for new, eco-friendly, non-toxic, cost effective, and efficient water treatment agents and flocculants. The present invention seeks to fulfill this need and provides further related advantages.

SUMMARY OF THE INVENTION

The present invention provides a method for removing solids from an aqueous suspension of solids. In one embodiment, the method comprises contacting an aqueous suspension of solids with a quantity of one or more polysaccharide agents sufficient to flocculate a portion of the solids, wherein the polysaccharide agent is obtainable by ethanol precipitation from an aqueous solution of a plant polysaccharide.

In one aspect, the invention provides methods for removing solids from an aqueous suspension of solid. In one embodiment, the method includes
contacting an aqueous suspension of solids with a quantity of a plant polysaccharide agent for a period of time sufficient to flocculate a portion of the solids to provide a suspension comprising flocculated solids, and
mechanically dewatering the suspension comprising flocculated solids to provide separated solids and an aqueous supernate.

In another embodiment, the method includes
contacting an aqueous suspension of solids having a first concentration of suspended solids with a quantity of a plant polysaccharide agent for a period of time sufficient to flocculate at least a portion of the solids to provide a suspension comprising flocculated solids, wherein the plant polysaccharide agent is an extract selected from fenugreek, cactus, okra, aloe, chia, psyllium, or tamarind extracts; and
removing at least a portion of the flocculated solids from the suspension comprising flocculated solids to provide an aqueous medium having a second concentration of suspended solids, wherein the first concentration is greater than the second concentration.

In another aspect, the invention provides compositions useful for removing solids from an aqueous suspension of solid. In one embodiment, the composition includes
(a) a fenugreek extract (e.g., obtained by ethanol precipitation from an aqueous fenugreek solution); and
(b) one or more plant polysaccharide extracts (e.g., obtained by ethanol precipitation from an aqueous plant polysaccharide solution),
wherein the ratio of fenugreek extract to the one or more plant polysaccharide extracts is from about 0.5 to 2.0 based on dry weight.

In one embodiment, the composition includes
(a) a fenugreek extract (e.g., obtained by ethanol precipitation from an aqueous fenugreek solution); and
(b) a tamarind gum or a tamarind extract (e.g., obtained by ethanol precipitation from an aqueous tamarind solution).

DESCRIPTION OF THE DRAWINGS

The foregoing aspects and many of the attendant advantages of this invention will become more readily appreciated as the same become better understood by reference to the following detailed description, when taken in conjunction with the accompanying drawings.

DETAILED DESCRIPTION OF THE INVENTION

Figure 1:
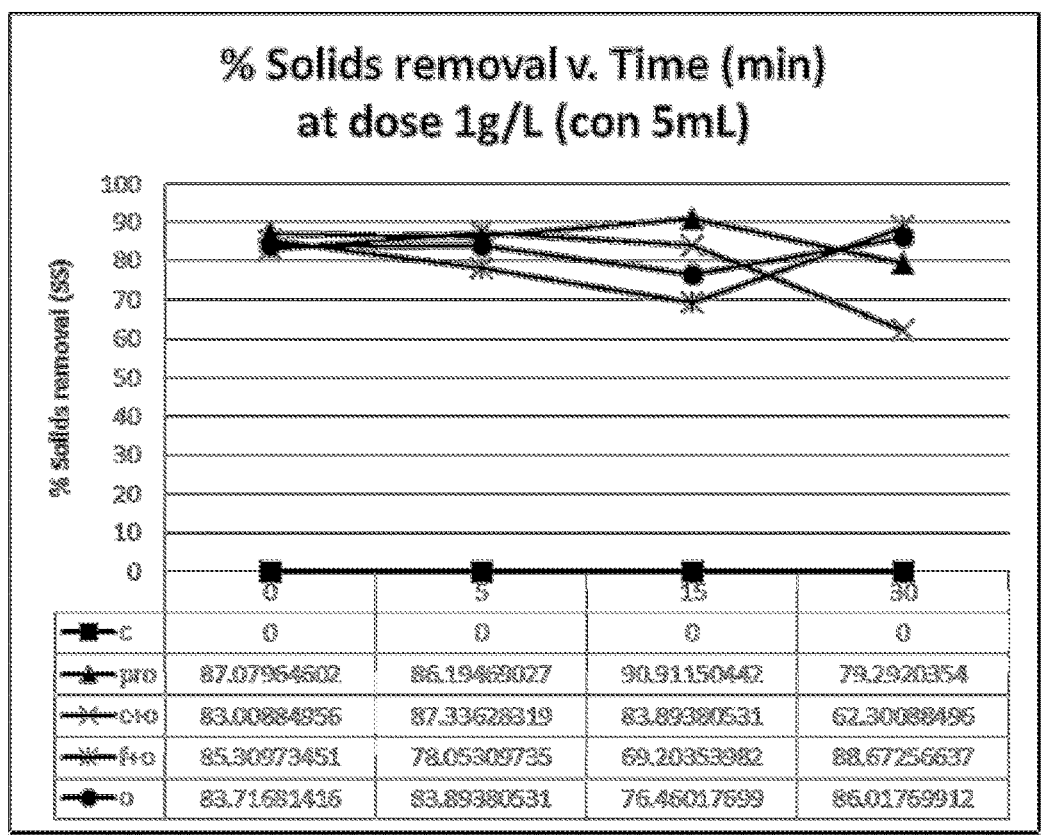
FIG. 1 is a plot showing percent removal of solids (municipal wastewater) as a function of time (0, 5, 15, and 30 minutes) for polysaccharide agents of the invention derived from cactus (c), okra (o), and fenugreek (f), c+o, f+o, and o compared to control (con), at a dose of 1 g/L. The ratio of polysaccharides in the polysaccharide combinations was 1:1 w/w.
Figure 2:
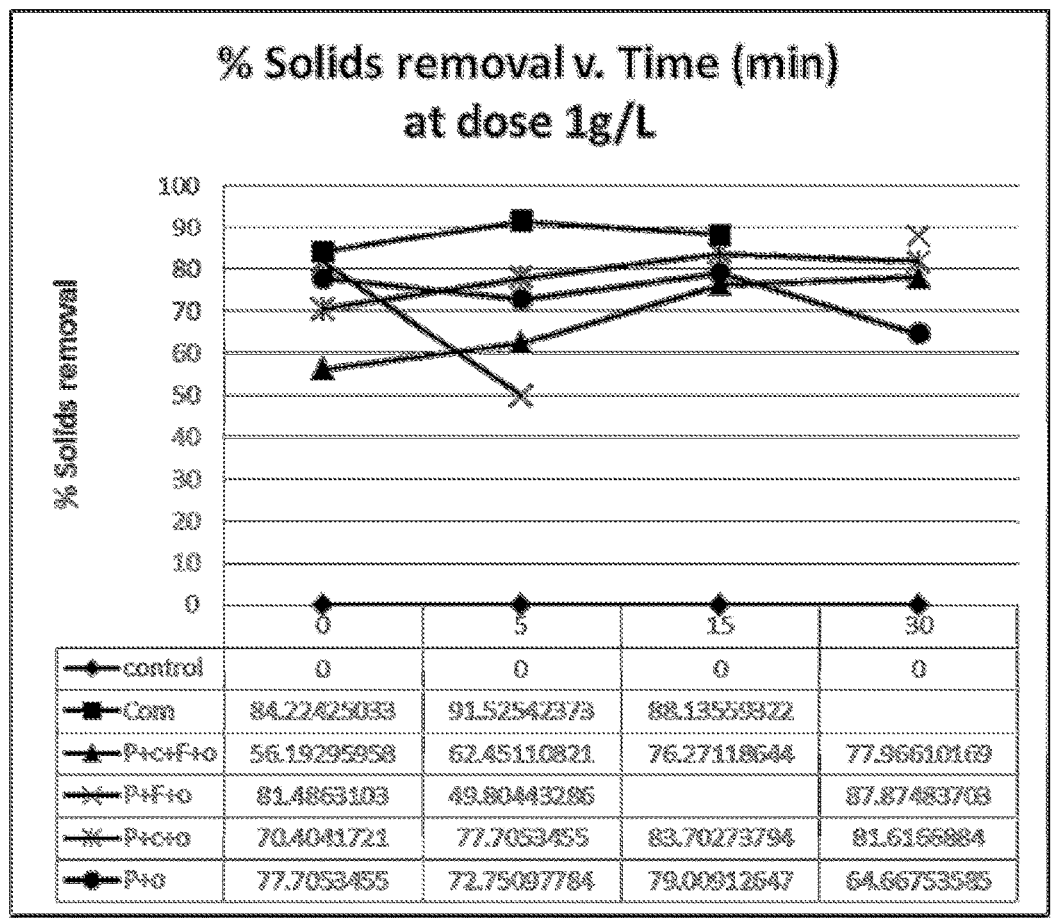
FIG. 2 is a plot showing percent removal of solids (municipal wastewater) as a function of time (0, 5, 15, and 30 minutes) for polysaccharide agents of the invention derived from cactus (c), okra (o), fenugreek (F), and psyllium (P), P+c+F+o, P+F+o, P+c+o, and P+o compared to control and a commercially available polymer, Polydyne (Com), at a dose of 1 g/L, approximate solids content was 3835 mg/L. The ratio of polysaccharides in the polysaccharide combinations was 1:1 w/w.
Figure 3:
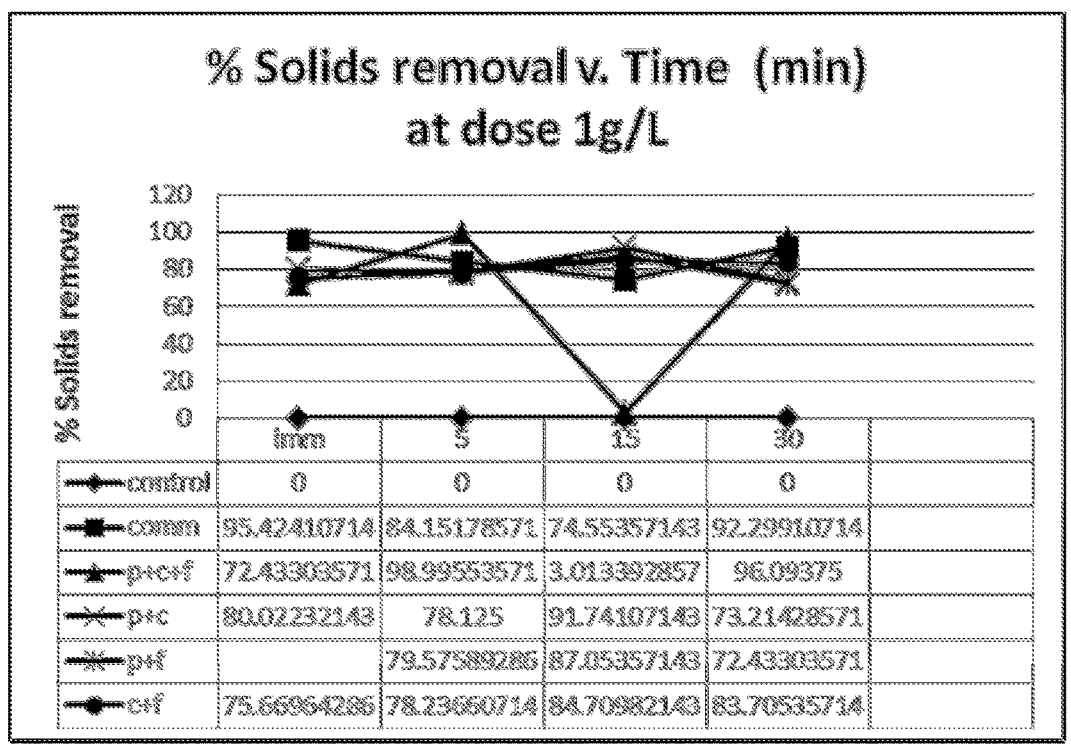
FIG. 3 is a plot showing percent removal of solids (municipal wastewater) as a function of time (0, 5, 15, and 30 minutes) for polysaccharide agents of the invention derived from cactus (c), okra (o), fenugreek (f), and psyllium (p), p+c+f, p+c, p+f, and c+f compared to control and a commercially available polymer, Polydyne (comm), at a dose of 1 g/L, approximate solids content was 4480 mg/L. The ratio of polysaccharides in the polysaccharide combinations was 1:1 w/w.
Figure 4:
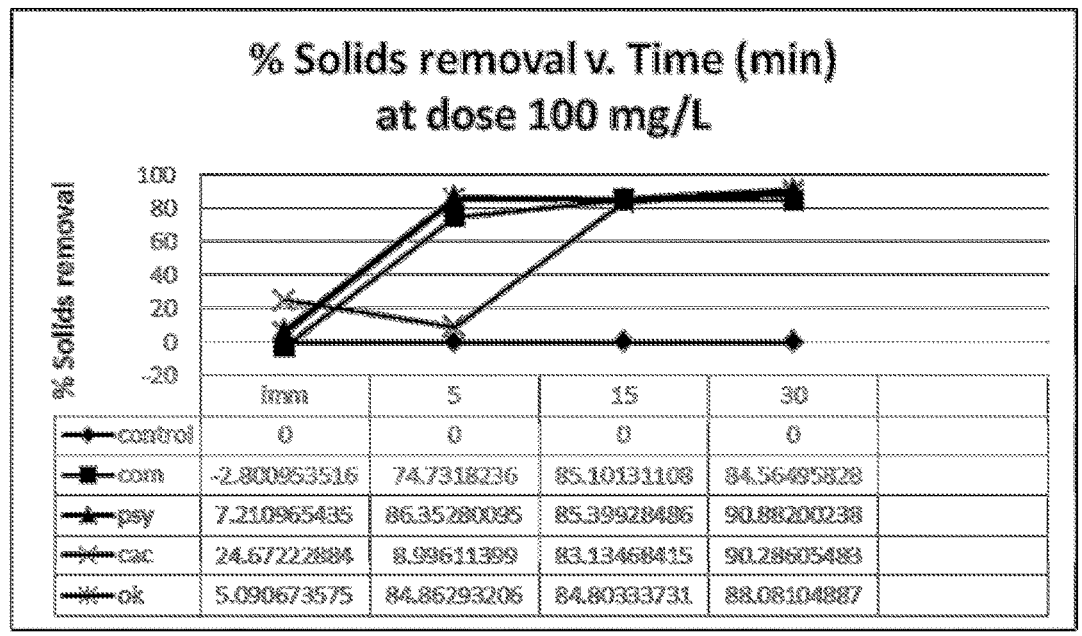
FIG. 4 is a plot showing percent removal of solids (biogas digestate) as a function of time (0, 5, 15, and 30 minutes) for polysaccharide agents of the invention derived from psyllium (psy), cactus (cac), and okra (ok), compared to control and a commercially available polymer, Polydyne (com), at a dose of 100 mg/L, approximate solids content was 8390 mg/L.
Figure 5:
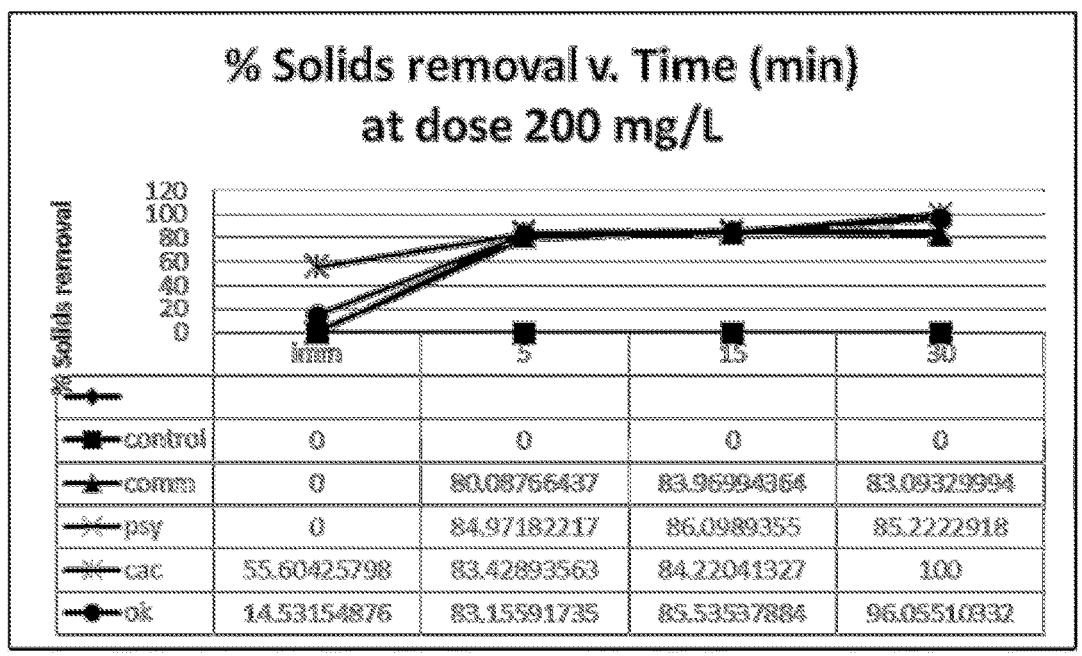
FIG. 5 is a plot showing percent removal of solids (biogas digestate) as a function of time (0, 5, 15, and 30 minutes) for polysaccharide agents of the invention derived from psyllium (psy), cactus (cac), and okra (ok), compared to control and a commercially available polymer, Polydyne (comm), at a dose of 200 mg/L, approximate solids content was 8390 mg/L.
Figure 6:
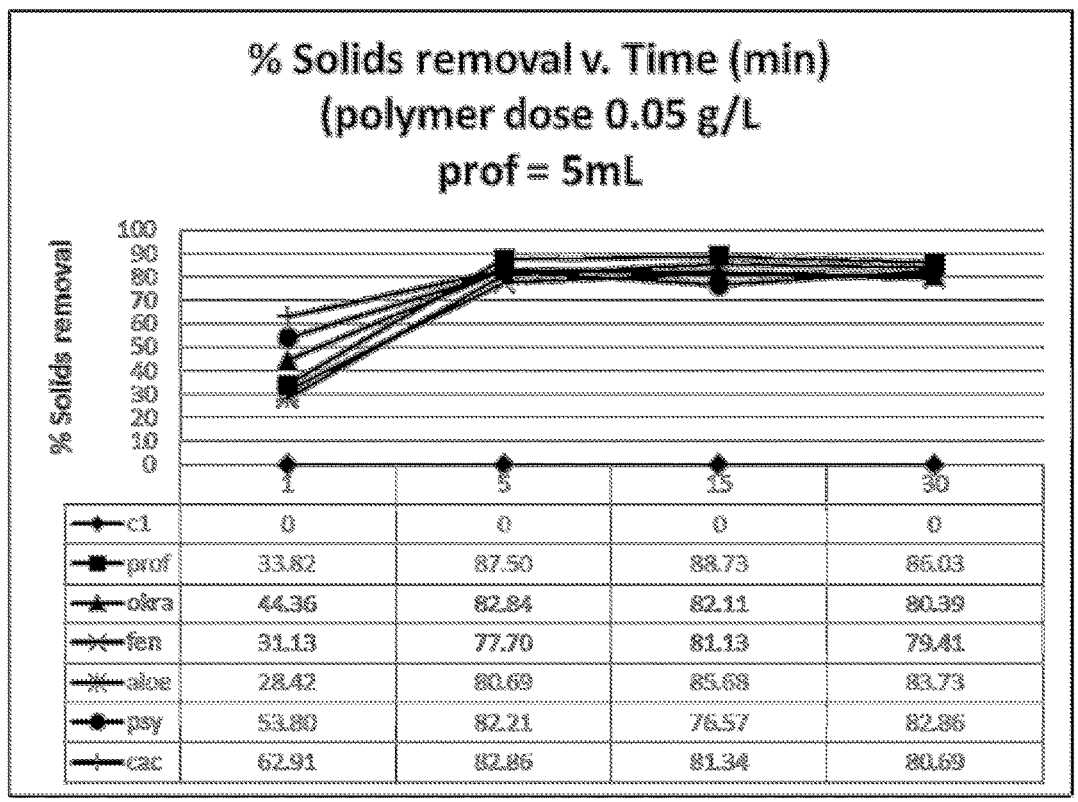
FIG. 6 is a plot showing percent removal of solids (municipal wastewater) as a function of time (0, 5, 15, and 30 minutes) for polysaccharide agents of the invention derived from okra (okra), fenugreek (fen), aloe (aloe), psyllium (psy), and cactus (cac) (each emulsion polymers), compared to control (cl) and a commercially available polymer, polyacrylamide (prof) (5 mL), at a dose of 50 mg/L, approximate solids content was 2040 mg/L.
Figure 7:
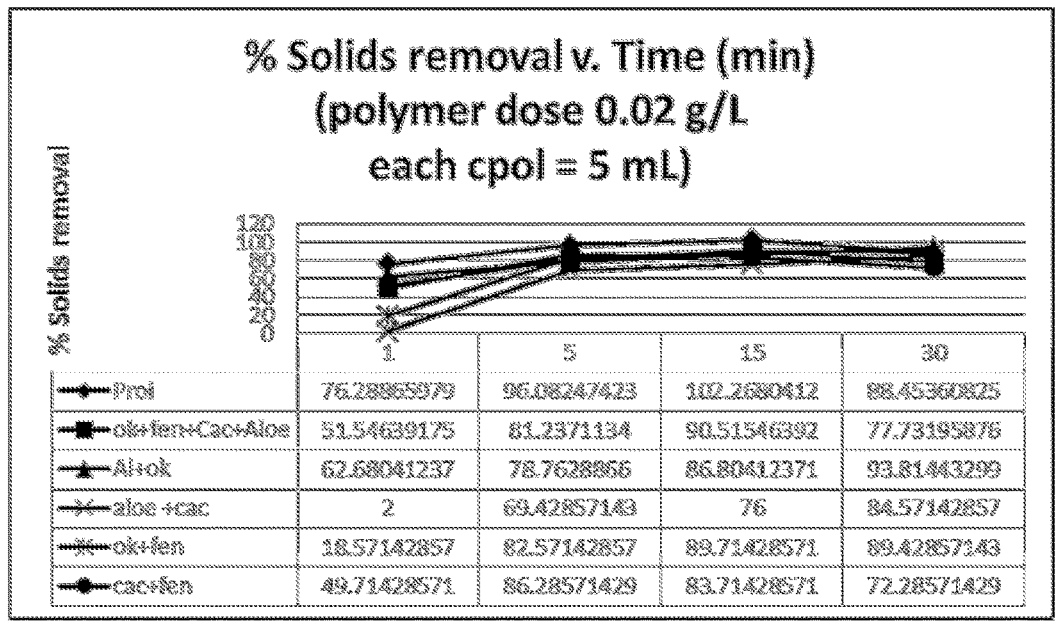
FIG. 7 is a plot showing percent removal of solids (municipal wastewater) as a function of time (0, 5, 15, and 30 minutes) for polysaccharide agents of the invention derived from cactus (cac), okra (ok), fenugreek (fen), and aloe (al), ok+fen+Cac+Aloe, Al+ok, aloe+cac, ok+fen, and cac+fen (each emulsion polymers), compared a commercially available polymer, polyacrylamide (proi) (5 mL), at a dose of 120 mg/L, approximate solids content was 2425 mg/L. The ratio of polysaccharides in the polysaccharide combinations was 1:1 w/w.
Figure 8:
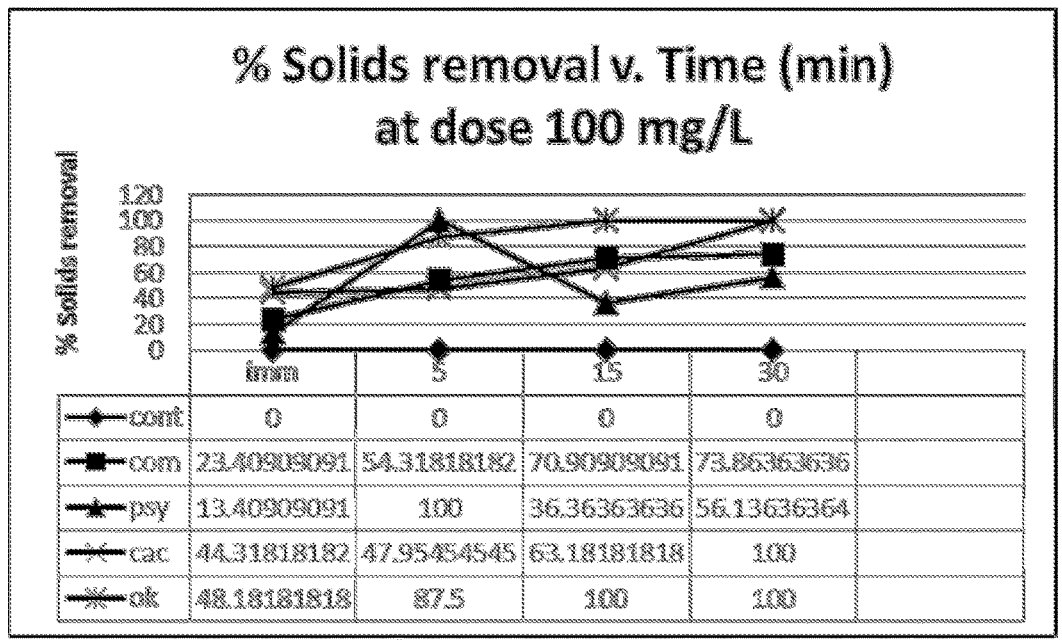
FIG. 8 is a plot showing percent removal of solids (biogas digestate) as a function of time (0, 5, 15, and 30 minutes) for polysaccharide agents of the invention derived from psyllium (psy), cactus (cac), and okra (ok), compared to control (cont) and a commercially available polymer, Polydyne (com), at a dose of 100 mg/L, approximate solids content was 6410 mg/L.
Figure 9:
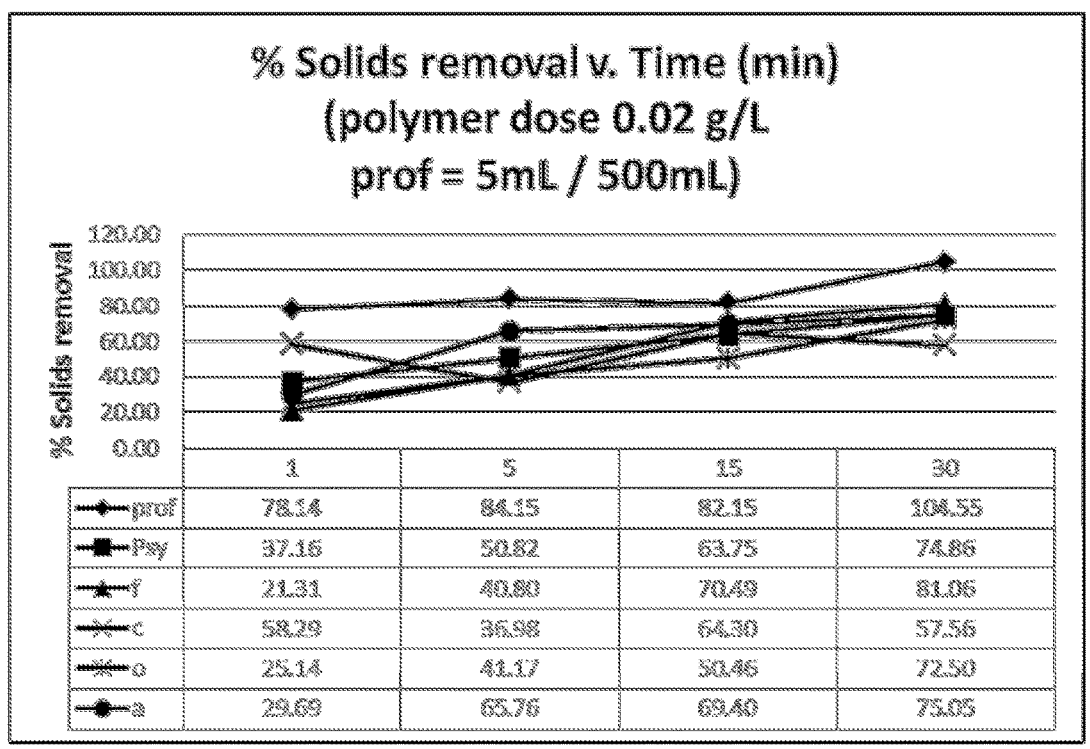
FIG. 9 is a plot showing percent removal of solids (municipal wastewater) as a function of time (1, 5, 15, and 30 minutes) for polysaccharide agents of the invention derived from cactus (c), okra (o), fenugreek (f), aloe (a), and psyllium (psy), compared to a commercially available polymer, polyacrylamide (prof) (5 mL/500 mL), at a dose of 20 mg/L, approximate solids content was 2745 mg/L.
Figure 10:
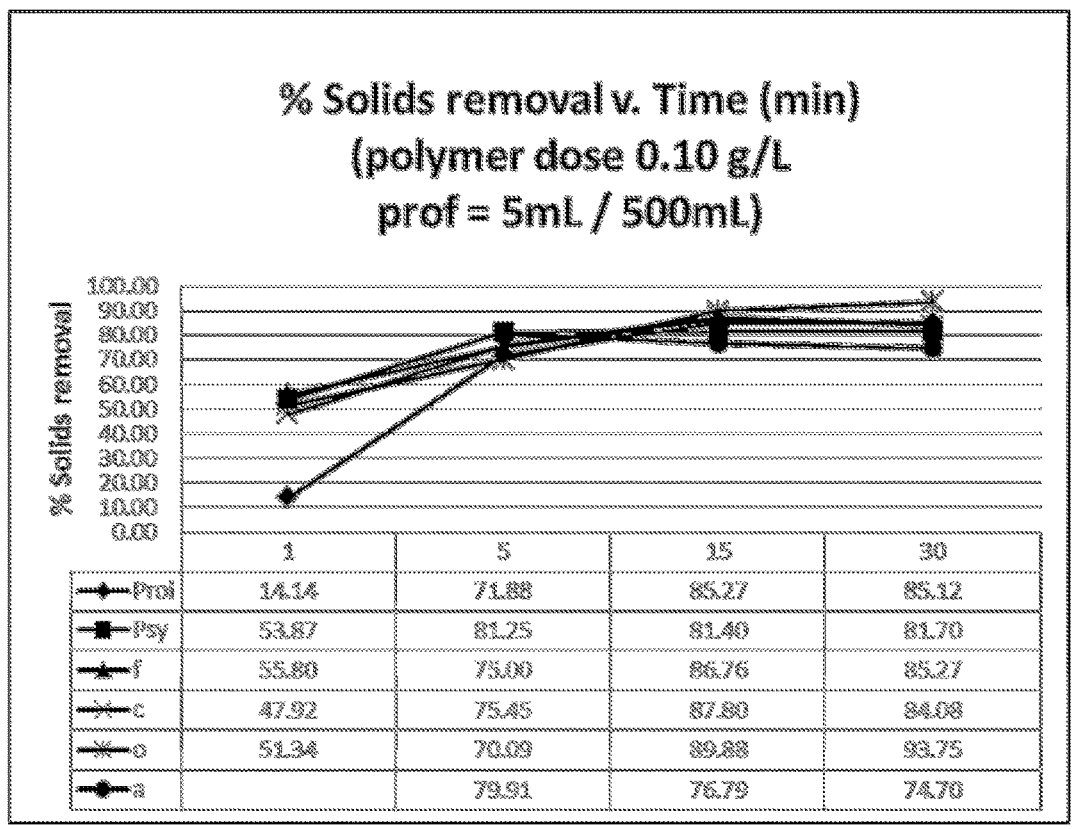
FIG. 10 is a plot showing percent removal of solids (municipal wastewater) as a function of time (1, 5, 15, and 30 minutes) for polysaccharide agents of the invention derived from cactus (c), okra (o), fenugreek (f), aloe (a), and psyllium (psy), compared to a commercially available polymer, polyacrylamide (prof) (5 mL/500 mL), at a dose of 100 mg/L, approximate solids content was 3360 mg/L.
Figure 11:
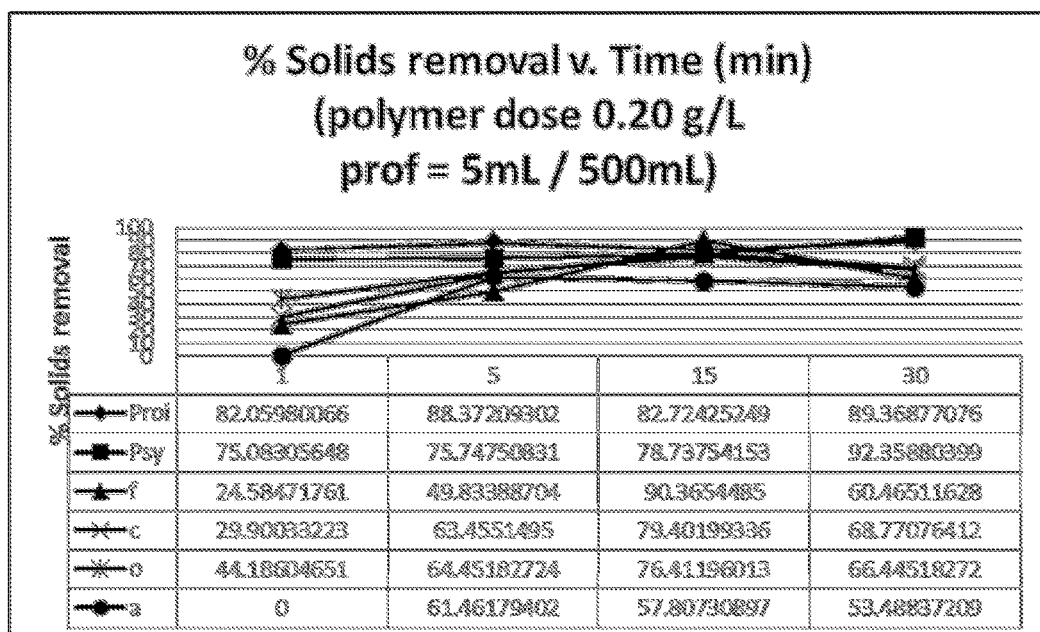
FIG. 11 is a plot showing percent removal of solids (municipal wastewater) as a function of time (1, 5, 15, and 30 minutes) for polysaccharide agents of the invention derived from cactus (c), okra (o), fenugreek (f), aloe (a), and psyllium (psy), compared to a commercially available polymer, polyacrylamide (prof) (5 mL/500 mL), at a dose of 200 mg/L, approximate solids content was 1505 mg/L.
Figure 12:
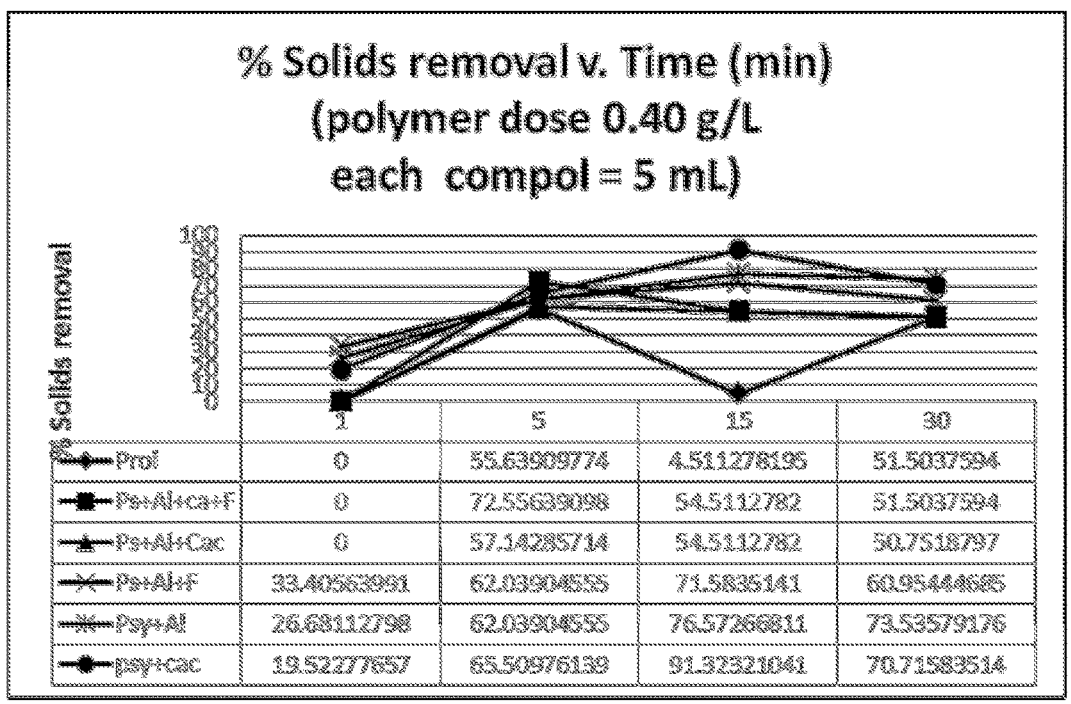
FIG. 12 is a plot showing percent removal of solids (municipal wastewater) as a function of time (1, 5, 15, and 30 minutes) for polysaccharide agents of the invention derived from psyllium (Ps or Psy)+aloe (Al)+cactus (ca or Cac)+fenugreek (F), Ps+Al+Cac, Ps+Al+F, Psy+Al, and psy+cac, compared to a commercially available polymer, polyacrylamide (Proi) (5 mL/500 mL) ("compol" refers to the polyacrylamide in emulsion form), at a dose of 400 mg/L, approximate solids content was 1330 mg/L.
Figure 13:
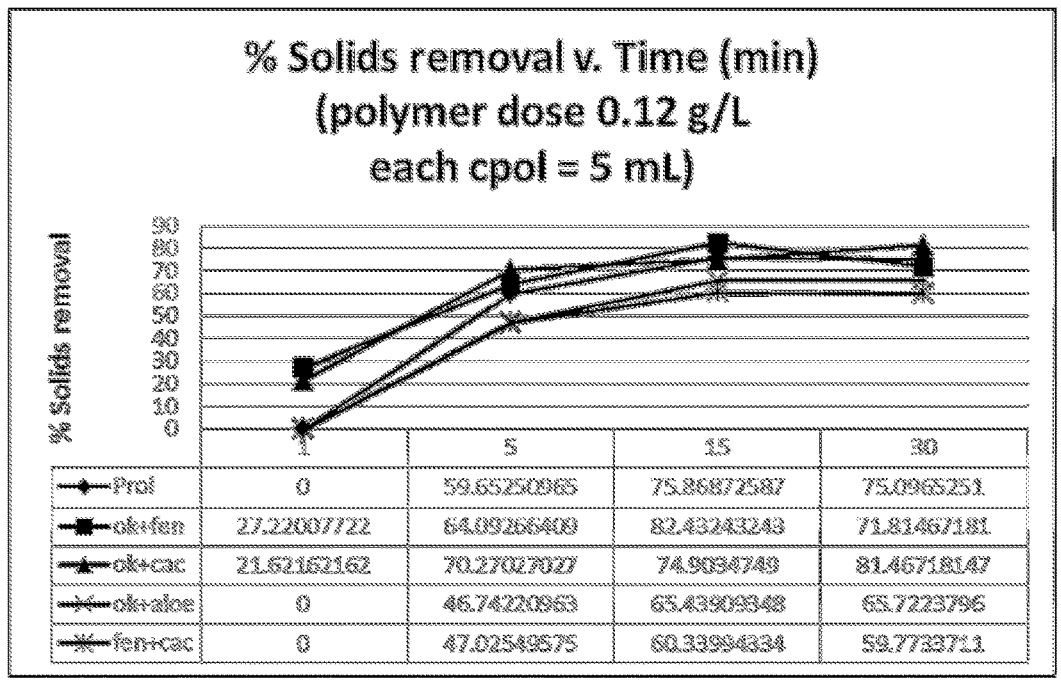
FIG. 13 is a plot showing percent removal of solids (municipal wastewater) as a function of time (1, 5, 15, and 30 minutes) for polysaccharide agents of the invention derived from okra (ok)+fenugreek (fen), ok+cactus (cac), ok+aloe, and fen+cac, compared to a commercially available polymer, polyacrylamide (prof) (5 mL/500 mL) ("cpol" refers to the polyacrylamide in emulsion form), at a dose of 120 mg/L, approximate solids content was 2590 mg/L.
Figure 14:
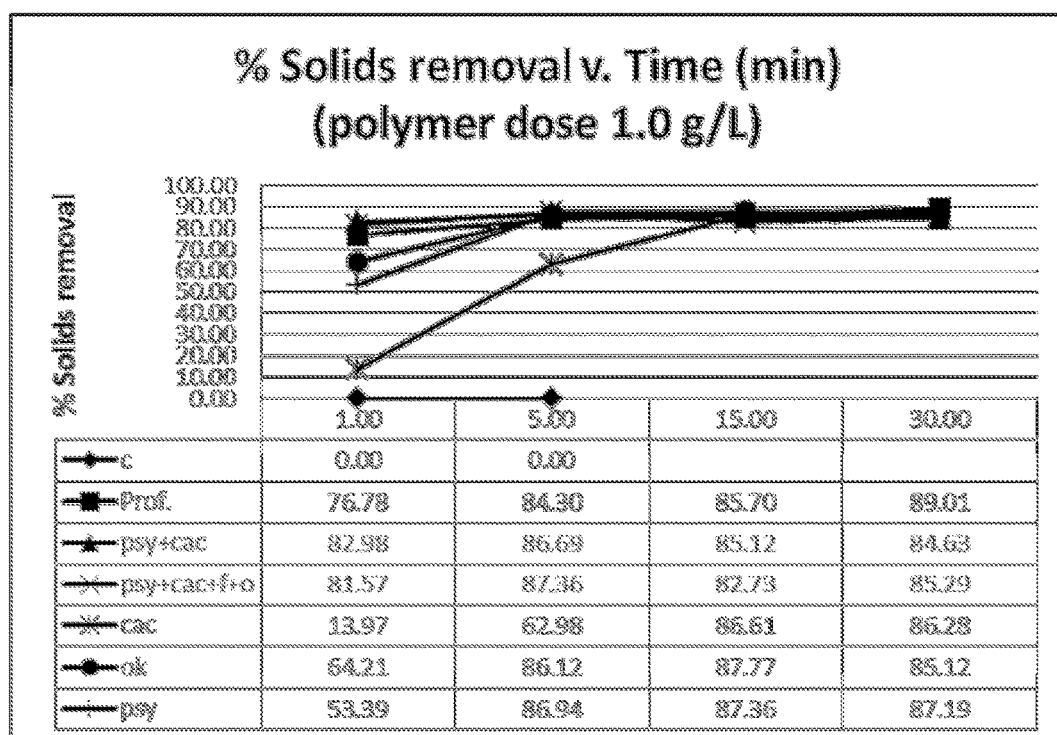
FIG. 14 is a plot showing percent removal of solids (biogas digestate) as a function of time (1, 5, 15, and 30 minutes) for polysaccharide agents of the invention derived from psyllium (psy)+cactus (cac), psy+Cac+fenugreek (f)+okra (o), cac, ok, and psy, compared to control (c) (and a commercially available polymer, polyacrylamide (prof) (5 mL/500 mL), at a dose of 1.0 g/L, approximate solids content was 6050 mg/L.
Figure 15:
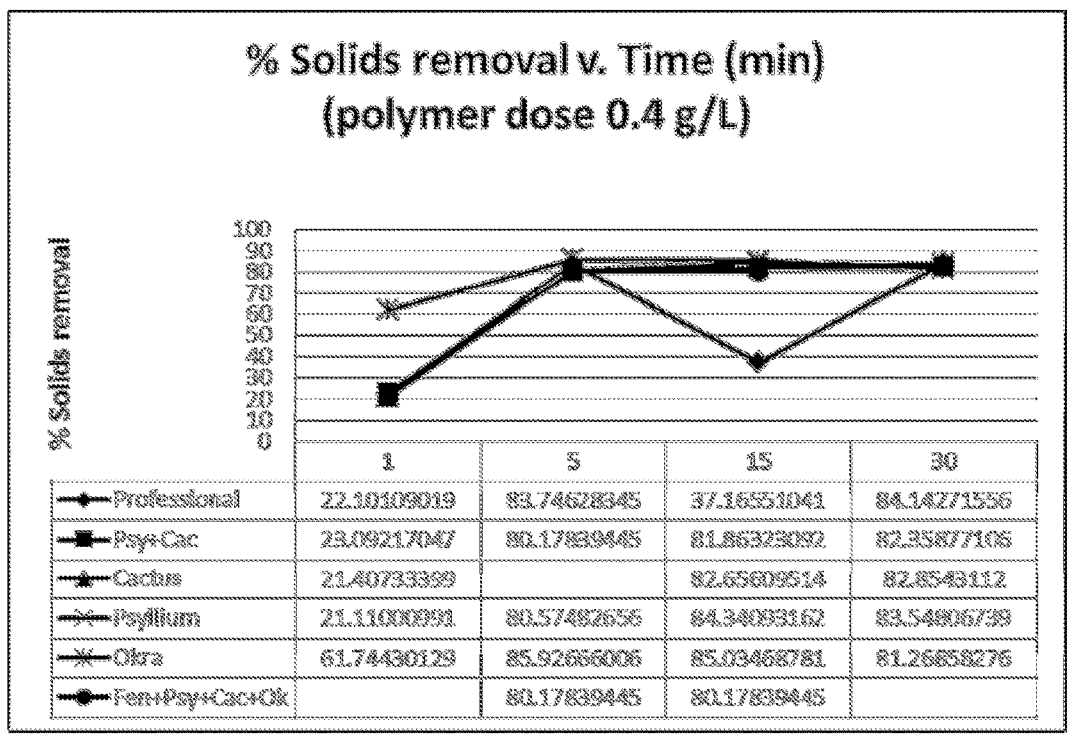
FIG. 15 is a plot showing percent removal of solids (municipal wastewater) as a function of time (1, 5, 15, and 30 minutes) for polysaccharide agents of the invention (solid dose) derived from psyllium (Psy)+cactus (Cac), Cactus, Psyllium, Okra (Ok), and fenugreek (Fen)+Psy+CAc+Ok, compared to a commercially available polymer, Polydyne (Professional), at a dose of 400 mg/L, approximate solids content was 5045 mg/L.
Figure 16:
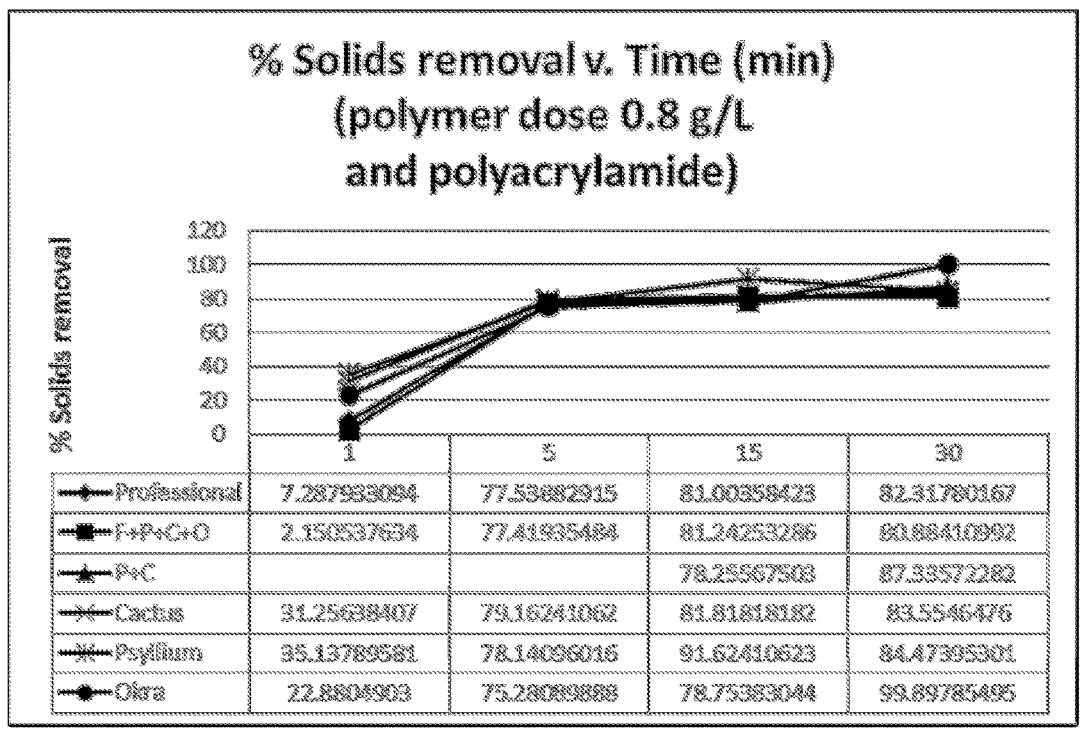
FIG. 16 is a plot showing percent removal of solids (municipal wastewater) as a function of time (1, 5, 15, and 30 minutes) for polysaccharide agents of the invention derived from fenugreek (F)+psyllium (P)+Cactus (C)+Okra (O), P+C, Cactus, Psyllium, and Okra, compared to a commercially available polymer, polyacrylamide (Professional), at a dose of 800 mg/L, approximate solids content was 4185 mg/L.
Figure 17:
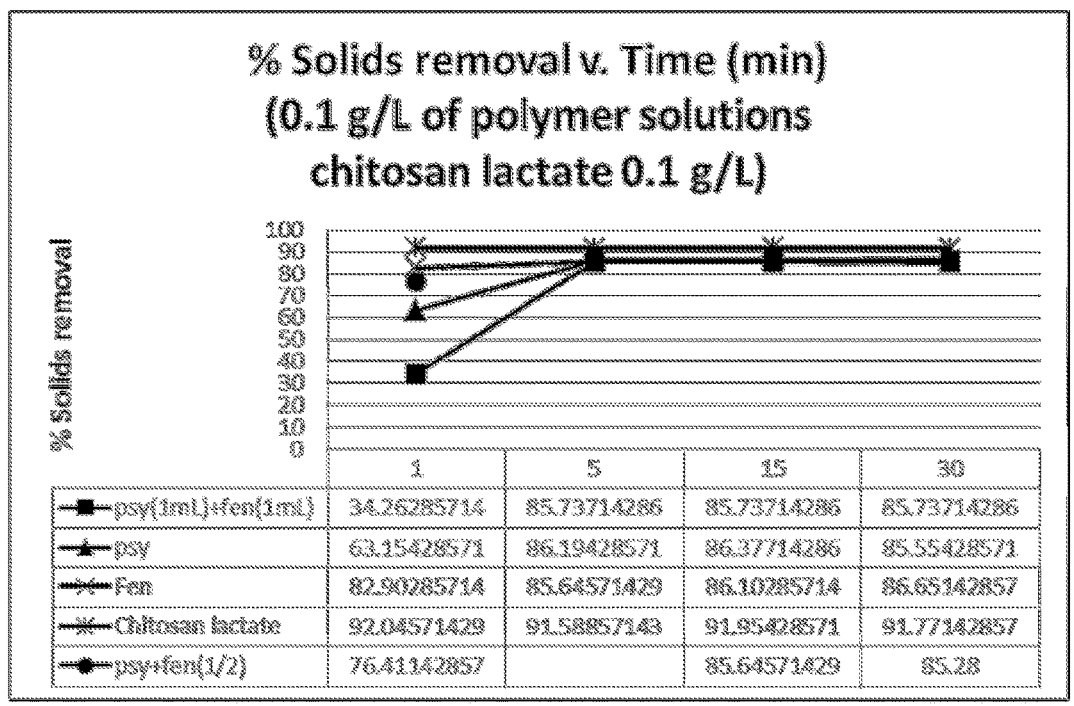
FIG. 17 is a plot showing percent removal of solids (municipal wastewater) as a function of time (1, 5, 15, and 30 minutes) for polysaccharide agents of the invention derived from psyllium (psy) (1 mL)+fenugreek (fen or Fen) (1 mL), psy, Fen, chitosan lactate (100 mg/L), and psy+fen (½), at a dose of 100 mg/L, approximate solids content was 3500 mg/L.
Figure 18:
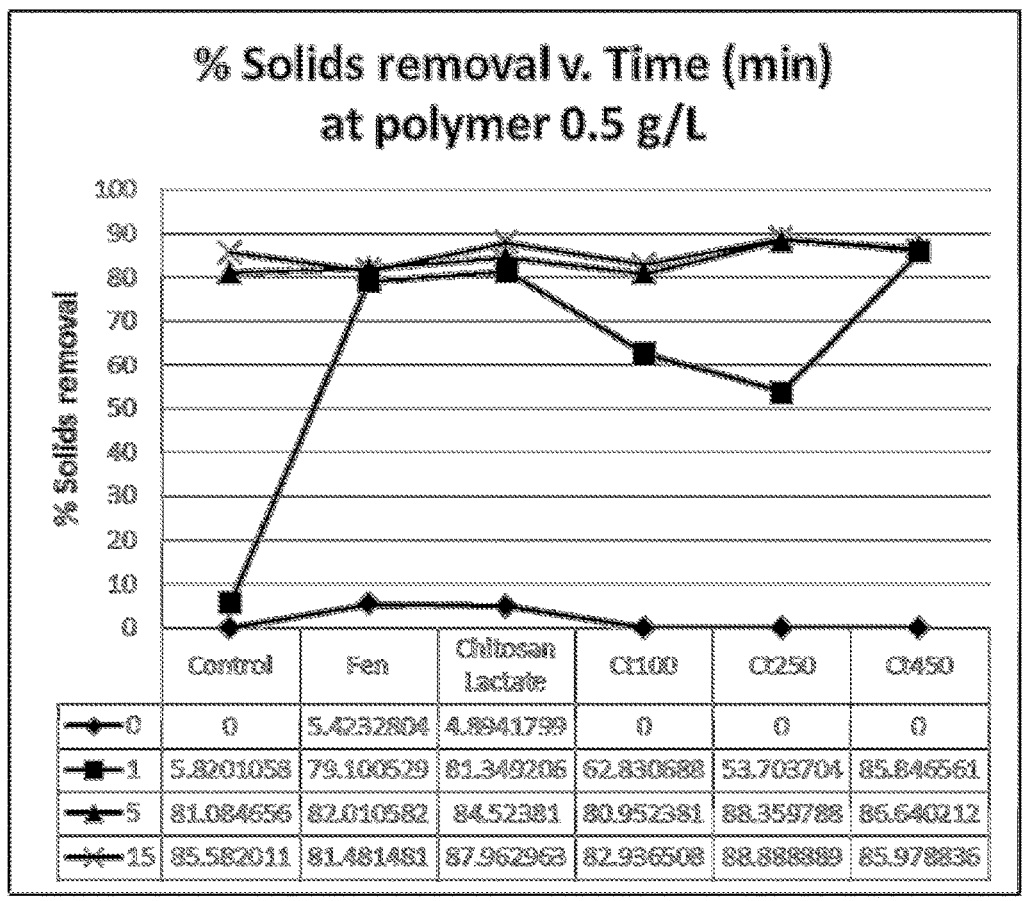
FIG. 18 is a plot showing percent removal of solids (municipal wastewater) as a function of time (0, 1, 5, and 15 minutes) for a polysaccharide agent of the invention derived from fenugreek (Fen), and chitosan lactate (100 mg/L), Ct100, Ct250, and Ct450, compared to control, at a dose of 500 mg/L, approximate solids content was 3780 mg/L. Ct100, Ct250, and Ct450 are chitosan-based flocculants commercially available from Dungeness Environmental under the designations CT100-XGLF, CT250-XGLF, and CT450-XGLF, respectively.
Figure 19:
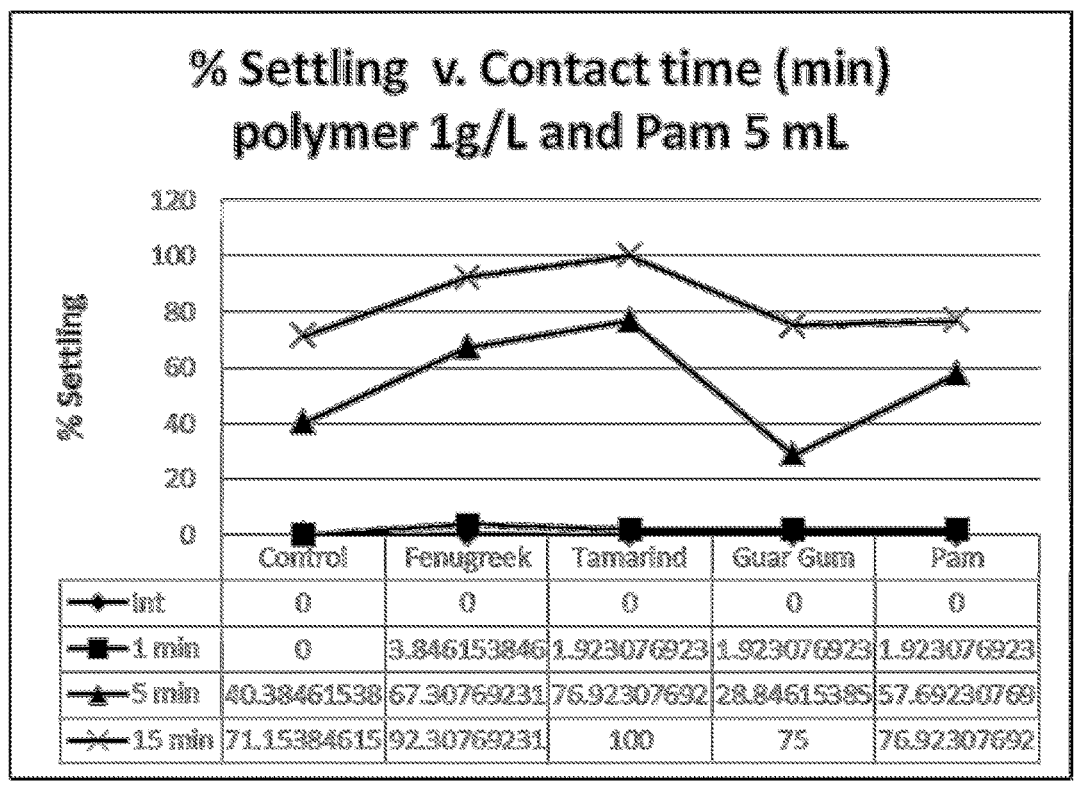
FIG. 19 is a plot showing settling (%) of solids (municipal wastewater) as a function of time (0, 1, 5, and 15 minutes) for a polysaccharide agent of the invention derived from fenugreek, and tamarind, guar gum, and polyacrylamide (Pam), compared to control, at a dose of 1 g/L.
Figure 20:
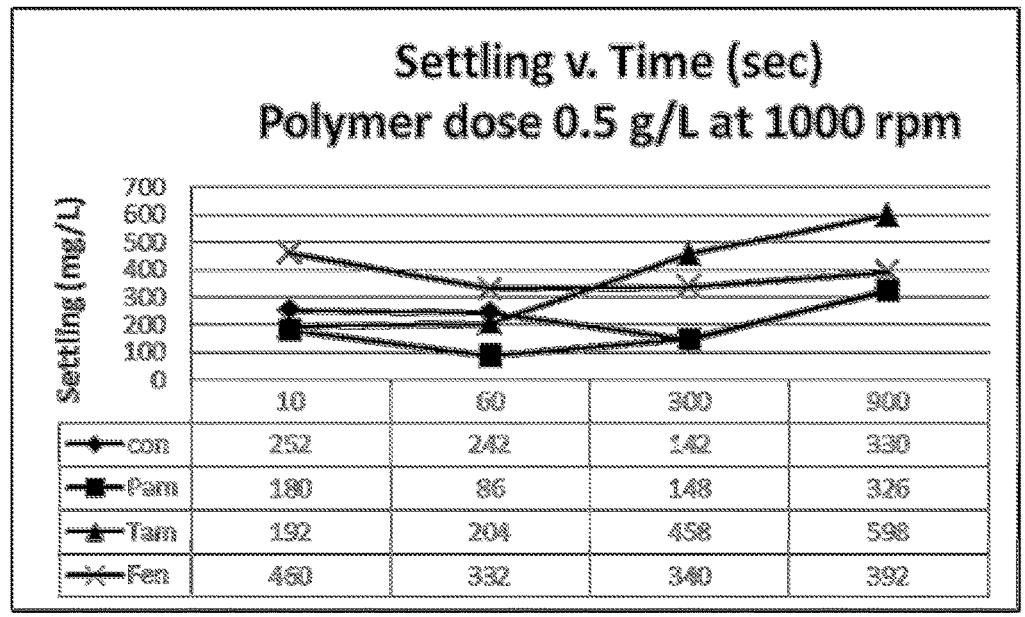
FIG. 20 is a plot showing settling of solids (municipal wastewater) as a function of time (10, 60, 300 and 900 seconds) for a polysaccharide agent of the invention derived from fenugreek (Fen), and tamarind (Tam), and polyacrylamide (Pam), compared to control, at a dose of 0.5 g/L. Centrifuge 1000 rpm.
Figure 21:
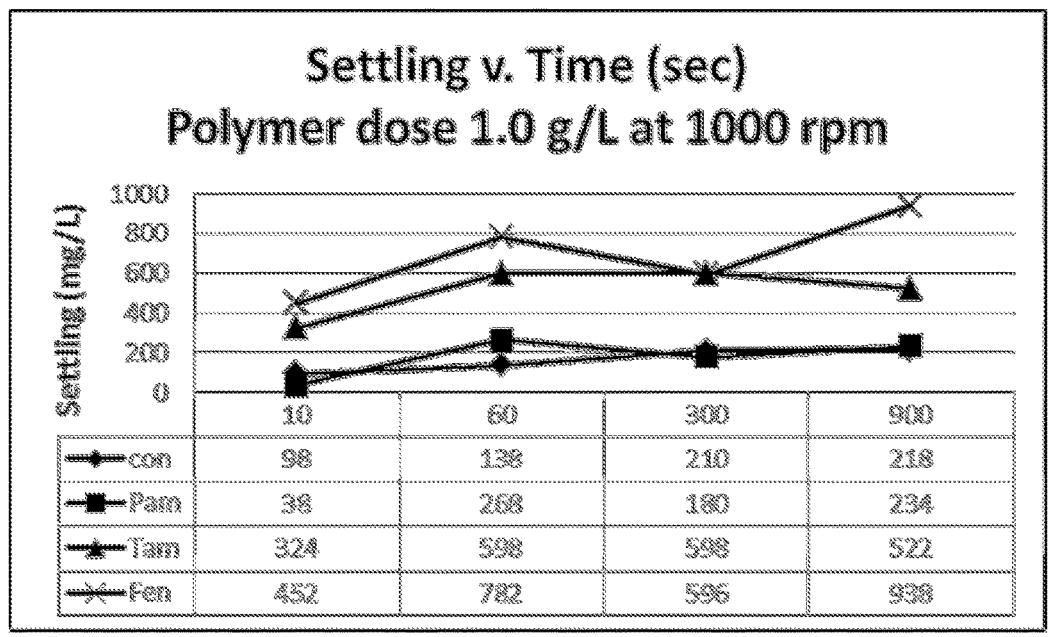
FIG. 21 is a plot showing settling of solids (municipal wastewater) as a function of time (10, 60, 300 and 900 seconds) for a polysaccharide agent of the invention derived from fenugreek (Fen), and tamarind (Tam), and polyacrylamide (Pam), compared to control, at a dose of 1.0 g/L. Centrifuge 1000 rpm.
Figure 22:
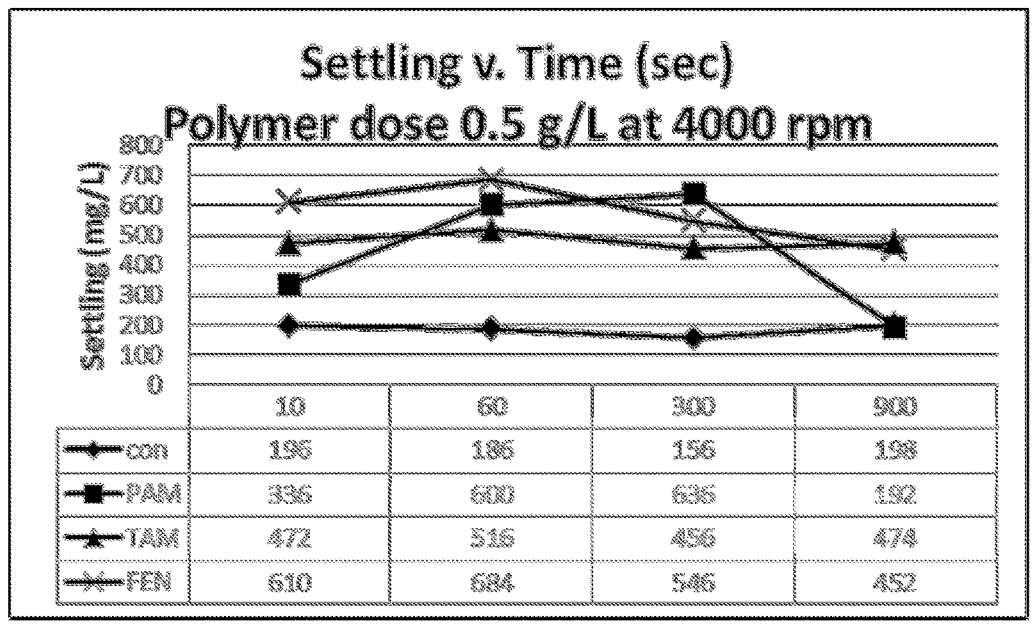
FIG. 22 is a plot showing settling of solids (municipal wastewater) as a function of time (10, 60, 300 and 900 seconds) for a polysaccharide agent of the invention derived from fenugreek (FEN), and tamarind (TAM), and polyacrylamide (PAM), compared to control, at a dose of 0.5 g/L. Centrifuge 4000 rpm.
Figure 23:
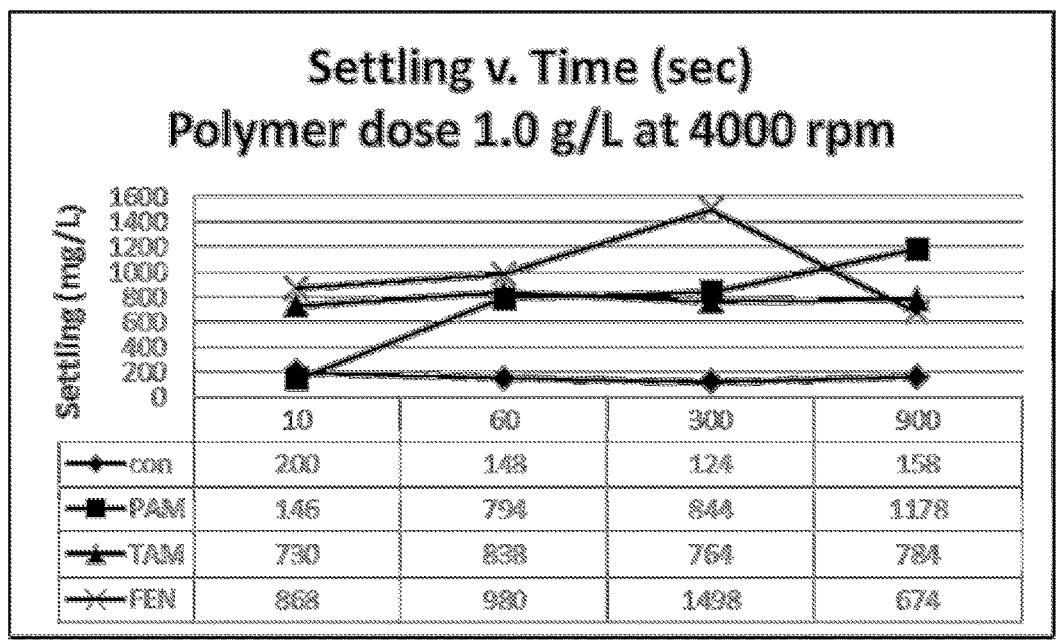
FIG. 23 is a plot showing settling of solids (municipal wastewater) as a function of time (10, 60, 300 and 900 seconds) for a polysaccharide agent of the invention derived from fenugreek (FEN), and tamarind (TAM), and polyacrylamide (PAM), compared to control, at a dose of 1.0 g/L. Centrifuge 4000 rpm.
Figure 24:
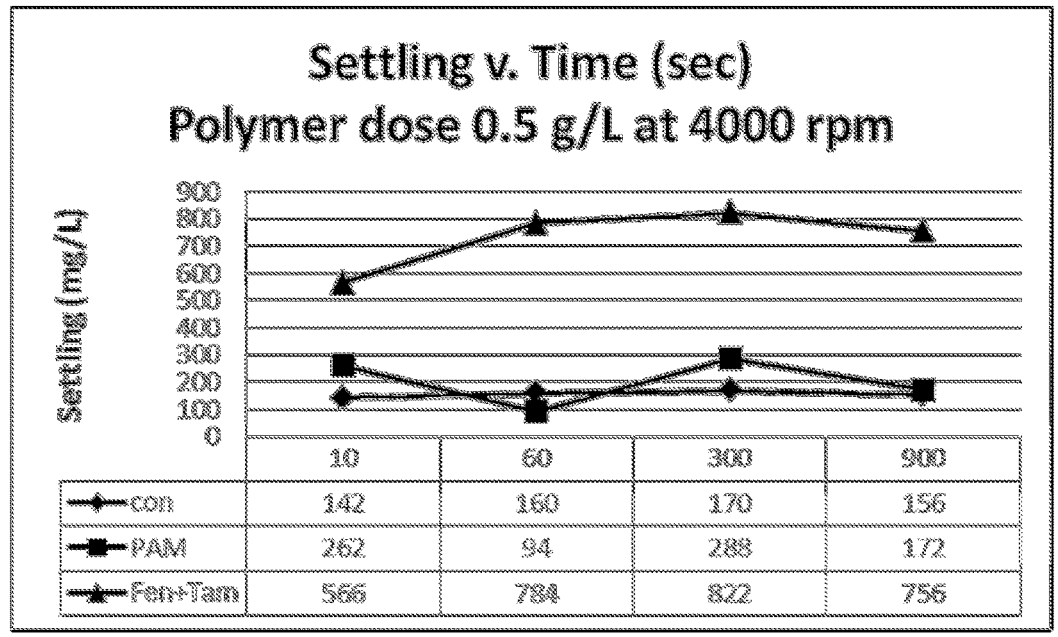
FIG. 24 is a plot showing settling of solids (municipal wastewater) as a function of time (10, 60, 300 and 900 seconds) for a polysaccharide agent of the invention derived from fenugreek (Fen)+tamarind (Tam), and polyacrylamide (PAM), compared to control, at a dose of 0.5 g/L. Centrifuge 4000 rpm.
Figure 25:
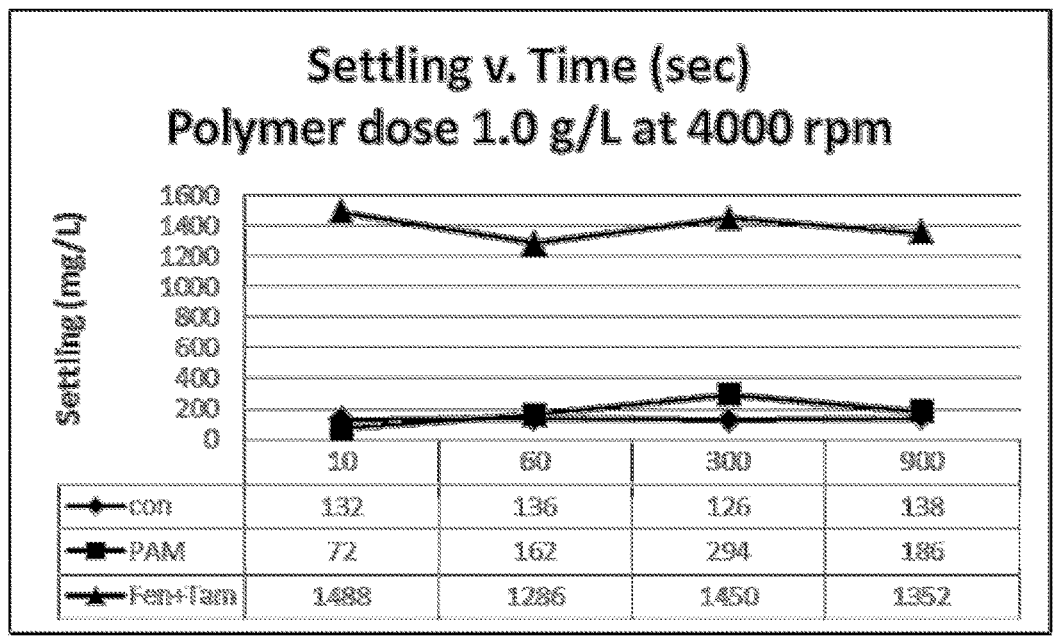
FIG. 25 is a plot showing settling of solids (municipal wastewater) as a function of time (10, 60, 300 and 900 seconds) for a polysaccharide agent of the invention derived from fenugreek (Fen)+tamarind (Tam), and polyacrylamide (PAM), compared to control, at a dose of 1.0 g/L. Centrifuge 4000 rpm.
Figure 26:
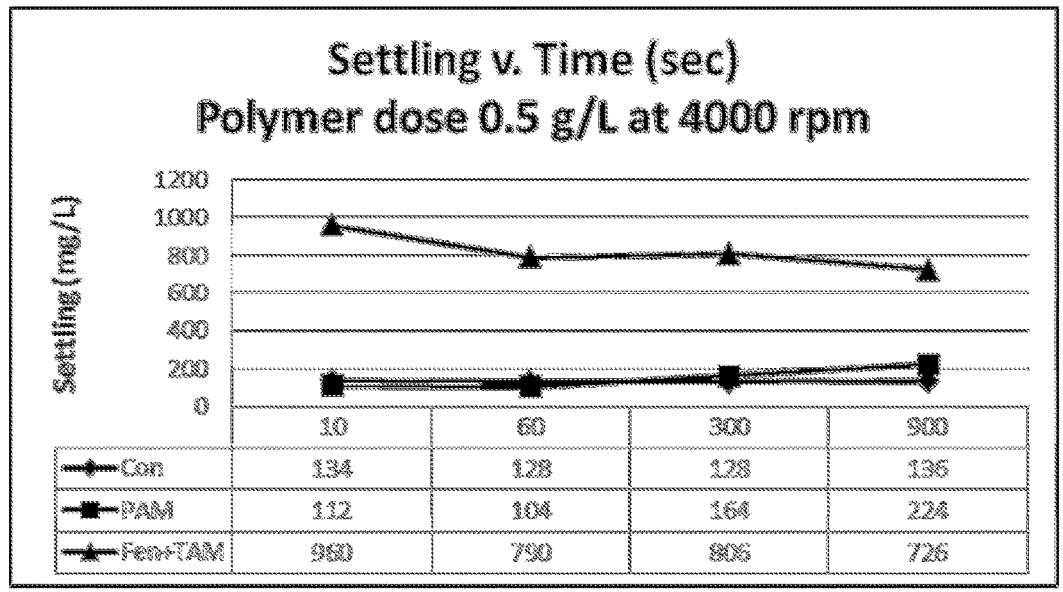
FIG. 26 is a plot showing settling of solids (municipal wastewater) as a function of time (10, 60, 300 and 900 seconds) for a polysaccharide agent of the invention derived from fenugreek (Fen)+tamarind (TAM), and polyacrylamide (PAM), compared to control, at a dose of 0.5 g/L. Centrifuge 4000 rpm.
Figure 27:
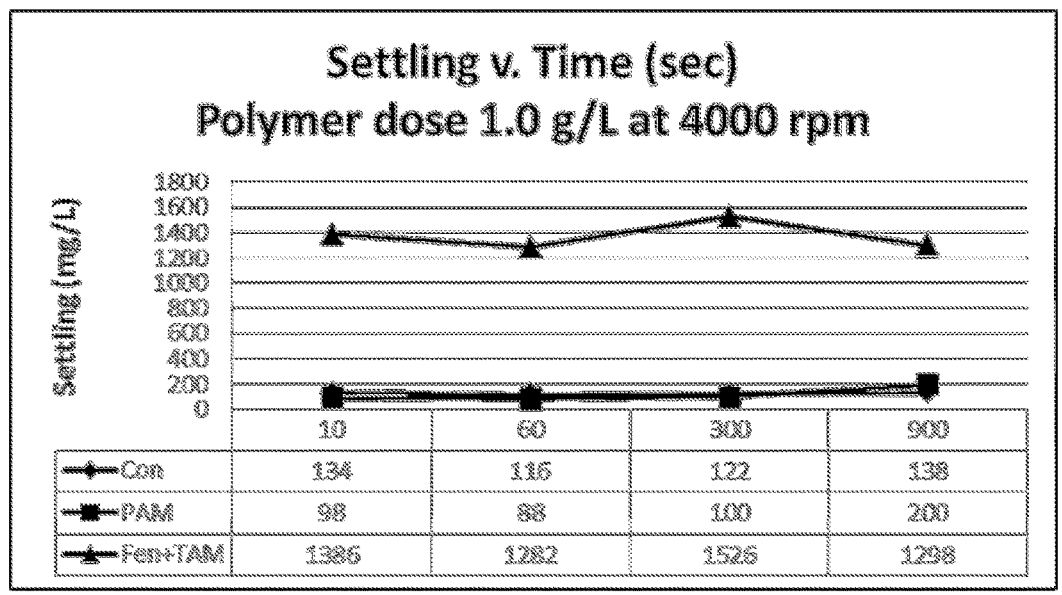
FIG. 27 is a plot showing settling of solids (municipal wastewater) as a function of time (10, 60, 300 and 900 seconds) for a polysaccharide agent of the invention derived from fenugreek (Fen)+tamarind (TAM), and polyacrylamide (PAM), compared to control, at a dose of 1.0 g/L. Centrifuge 4000 rpm.
Figure 28:
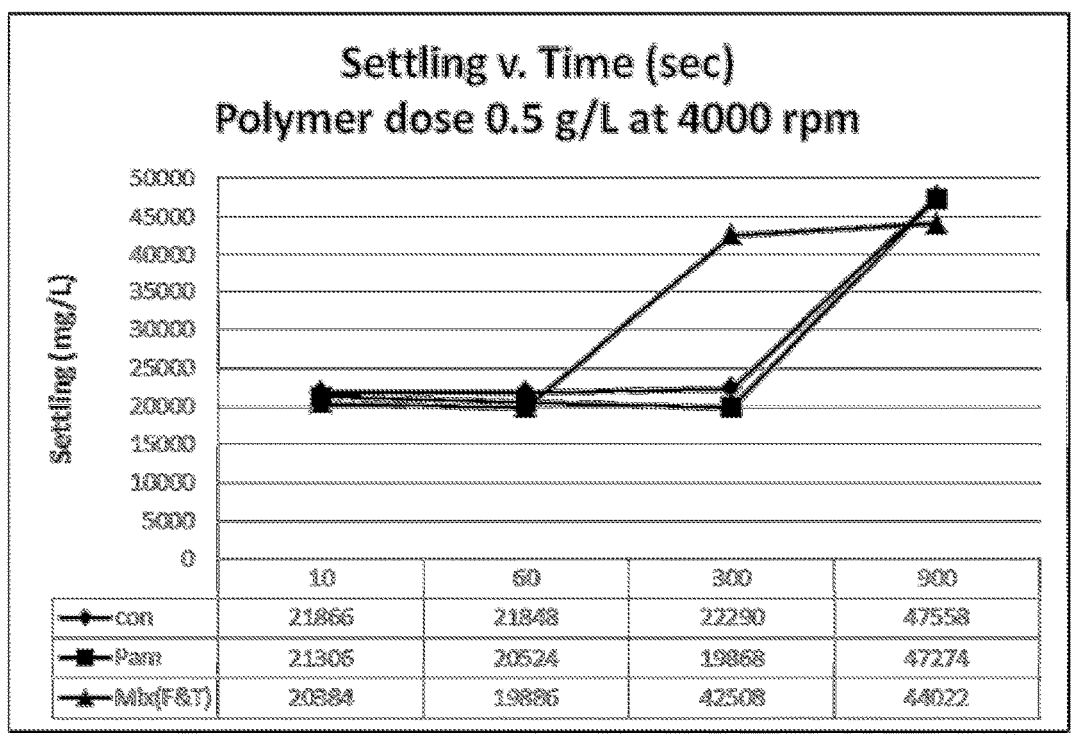
FIG. 28 is a plot showing settling of solids (food waste) as a function of time (10, 60, 300 and 900 seconds) for a polysaccharide agent of the invention derived from fenugreek and tamarind (Mix(F&T)), and polyacrylamide (PAM), compared to control, at a dose of 0.5 g/L. Centrifuge 4000 rpm.
Figure 29:
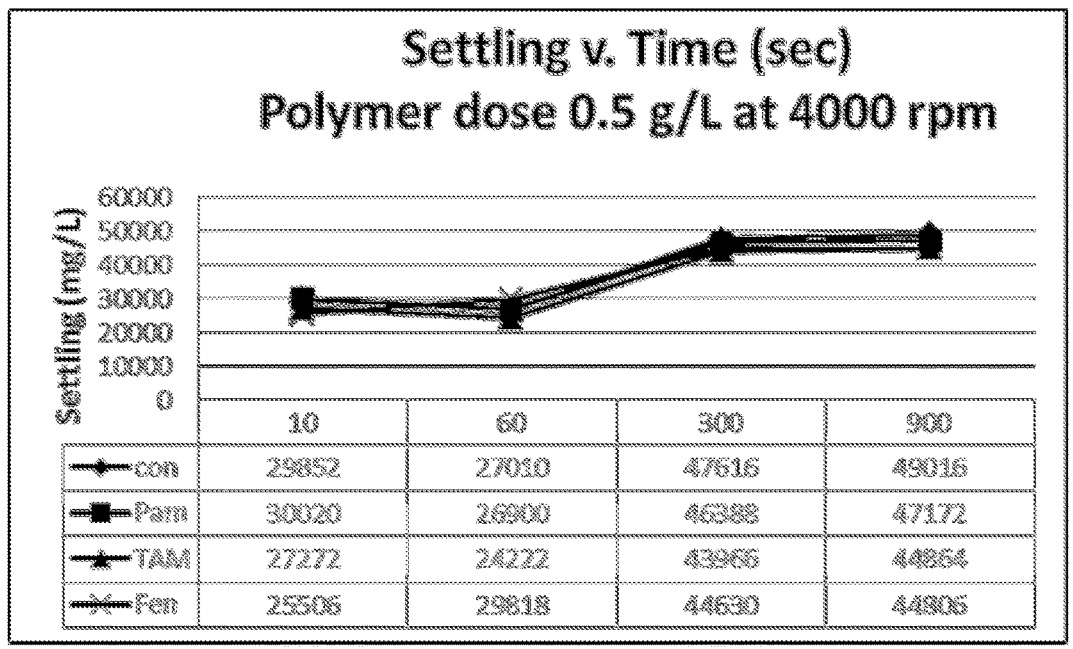
FIG. 29 is a plot showing settling of solids (food waste) as a function of time (10, 60, 300 and 900 seconds) for a polysaccharide agent of the invention derived from fenugreek (Fen)+tamarind (TAM), and polyacrylamide (PAM), compared to control, at a dose of 0.5 g/L. Centrifuge 4000 rpm.

The present invention relates to plant polysaccharide agents useful for the treatment of water. In one aspect, the invention provides plant polysaccharide water treatment agents. In another aspect of the invention, methods for using the plant polysaccharide agents to treat water are provided. The polysaccharide agents of the invention are effective to treat a variety of waters, including contaminated and wastewaters. The water treatment agents of the invention serve as flocculants and adsorbents effective to separate solids, organic and inorganic pollutants, and pathogens from water.

Polysaccharides derived from plant sources are renewable materials, widely available, and possess biological and chemical properties including non-toxicity, biocompatibility, biodegradability, and polyfunctionality. The present invention relates to polysaccharides and their hybrids from food grade plant materials (seeds of fenugreek and tamarind, husks from psyllium, fruits of okra, cladodes of cactus, leaves of aloe vera) and similar galactomannans, for purification of water and wastewater from various sources including biogas digestate. This invention also includes simple methods of application of these materials as flocculants to achieve maximum contaminant removal efficiency from water and wastewater. These materials are designed to have flexible properties so that these materials can be used for the purification of wastewater from different sources with few changes in their mixing ratios. These materials can be used as a solid polymer or in emulsion form and can be used in variety of contaminated water management.

The polysaccharide agents of the invention are derived from plants. In certain embodiments, the plant polysaccharides are galactomannans and glucomannans. In certain embodiments, the polysaccharide agents (e.g., flocculants/adsorbent) are food grade polymers derived from various parts of the plants and are non-toxic to the ecosystem.

Representative polysaccharide agents are derived from Fenugreek *Foenum garceum*, Okra *Hibiscus esculentus*, Psyllium *Plantago psyllium*, Aloe *Barbadensis miller*, and Cactus *Opuntia ficus* Indica, Chia, and Tamarind.

Polysaccharide agents can be used alone or in combination in various ratios and concentrations to achieve maximum removal of solids in short periods of time ranging from a few seconds to 30 minutes. Their efficiencies were compared with the commercially available synthetic and biopolymers like polyacrylamide, chitosan, guargum, and polydyne.

Wastewater samples from different sources (e.g., municipal wastewater and biogas food waste digestate) were used to determine flocculation efficiencies.

Polysaccharide Agents

The following is description of the polysaccharides from which are derived the polysaccharide agents useful in the present invention.

Okra (*Hibiscus esculentus*). Soluble in cold water and used in the food industry as an emulsifying and foam stabilizing agent. Okra mucilage is a natural anionic polysaccharide composed of D-galactose, L-rhamnose, and D-galacturonic acid. The structures of these polysaccharides are shown below.

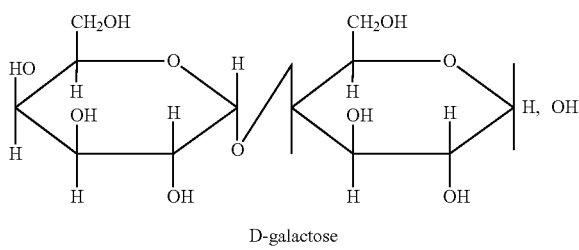

D-galactose

-continued

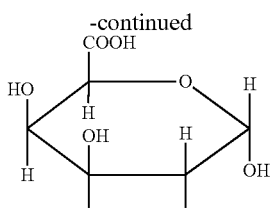

D-galacturonic acid

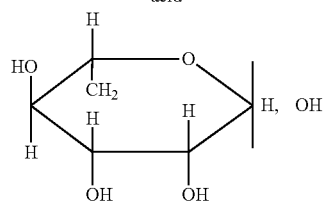

L-Rhamnose

Fenugreek (*Trigonella foenum-graecum*). Similar to clover in appearance, the small brown seed of fenugreek are medicinally important. The mucilage is obtained by extraction of milled seeds with cold water. Fenugreek mucilage is a neutral polysaccharide containing D-galactose and D-mannose. The structures of these polysaccharides are shown below.

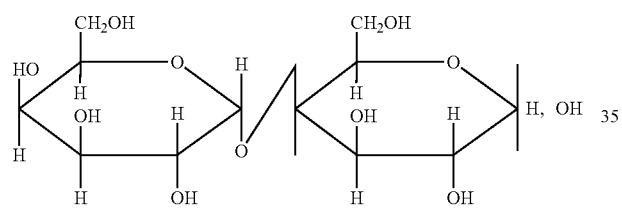

D-galactose

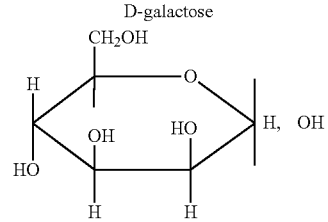

D-mannose

Psyllium (*Plantago psyllium*). Commonly known as "Isabgol Husk" in India and is used as a laxative. *P. psyllium* is an anionic mucilage belonging to *plantago* genus. This mucilage finds extensive applications in the field of medicines and is composed of L-arabinose, D-xylose and D-galactoronic acid. The structures of these polysaccharides are shown below.

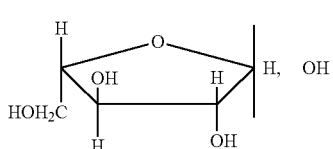

L-arabinose

-continued

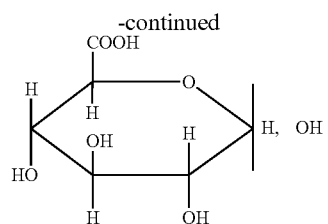

D-xylose

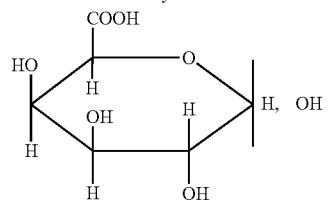

D-galacturonic acid

Cactus (*Opuntia Ficus-Indica*). The polysaccharide derived from cactus is referred to as pectin polysaccharide and is used as direct food and is considered a potential industrial hydrocolloid. In general, the polysaccharide contains varying proportions of L-arabinose (pyranose and furanose forms), D-galactose, L-rhamnose, and D-xylose as the major neutral sugar units as well as D-galacturonic acid. The suggested primary structure describes the molecule as a linear repeating core chain of (1,4)-linked β-D-galacturonic acid and α(1,2)-linked L-rhamnose with trisaccharide side chains of β(1,6)-linked D-galactose attached at O(4) of L-rhamnose residues.

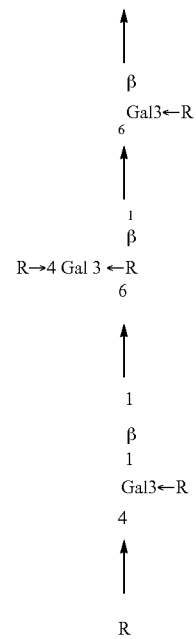

R = arabinose or xylose

Aloe Vera (Aloe *Barbadensis Miller*). Belongs to Asphodelaceae (Liliaceae) family, and is a shrubby or arborescent, perennial, xerophytic, succulent, pea-green color plant that grows mainly in the dry regions of Africa, Asia, Europe, and America. In India, aloe is found in Rajasthan, Andhra Pradesh, Gujarat, Maharashtra, and Tamil Nadu. Aloe has been used for several medicinal purposes. The general structure is shown below.

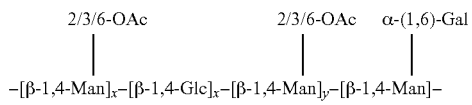

Methods for Removing Solids from Aqueous Suspensions

In one aspect, the invention provides methods for removing solids from an aqueous suspension of solid.

In one embodiment, the method includes contacting an aqueous suspension of solids with a quantity of a plant polysaccharide agent for a period of time sufficient to flocculate a portion of the solids to provide a suspension comprising flocculated solids, and mechanically dewatering the suspension comprising flocculated solids to provide separated solids and an aqueous supernate.

Suitable means for mechanically dewatering (i.e., solids separation) of aqueous suspensions are known in the art. Representative mechanical dewatering means include centrifugation means, band filters, screw presses, and filter presses.

In certain embodiments, the method further includes removing at least a portion of the separated solids from the aqueous supernate. In certain embodiments, removing at least a portion of the separated solids from the aqueous supernate includes filtration.

Suitable plant polysaccharide agents includes galactomannans and/or glucomannans.

Representative plant polysaccharide agents include extracts selected from cactus, okra, fenugreek, aloe, chia, psyllium, and tamarind extracts. In one embodiment, the plant polysaccharide agent is a fenugreek extract. In certain embodiments, the polysaccharide agent is an extract of two or more of cactus, okra, fenugreek, aloe, chia, psyllium, or tamarind extracts. In one embodiment, the polysaccharide agent is a combination of an extract of fenugreek and an extract of tamarind.

In another embodiment, the method includes contacting an aqueous suspension of solids having a first concentration of suspended solids with a quantity of a plant polysaccharide agent for a period of time sufficient to flocculate at least a portion of the solids to provide a suspension comprising flocculated solids, wherein the plant polysaccharide agent is an extract selected from fenugreek, cactus, okra, aloe, chia, psyllium, or tamarind extracts; and removing at least a portion of the flocculated solids from the suspension comprising flocculated solids to provide an aqueous medium having a second concentration of suspended solids, wherein the first concentration is greater than the second concentration.

Suitable means for removing at least a portion of the flocculated solids from the suspension (i.e., solids separation) of aqueous suspensions are known in the art. Representative removal means include mechanical dewatering means, such as filters, centrifugation means, band filters, screw presses, and filter presses.

As noted above, suitable plant polysaccharide agents includes galactomannans and/or glucomannans. Representative plant polysaccharide agents include extracts selected from cactus, okra, fenugreek, aloe, chia, psyllium, and tamarind extracts. In one embodiment, the plant polysaccharide agent is a fenugreek extract. In certain embodiments, the polysaccharide agent is an extract of two or more of cactus, okra, fenugreek, aloe, chia, psyllium, or tamarind extracts. In one embodiment, the plant polysaccharide agent is a combination of two or more extracts including fenugreek extract. In another embodiment, the polysaccharide agent is a combination of an extract of fenugreek and an extract of tamarind.

In certain embodiments, contacting an aqueous suspension of solids with a quantity of a plant polysaccharide agent further comprises contacting with a tamarind gum. In one embodiment, the suspension is contacted with a combination of fenugreek extract and tamarind gum or tamarind extract (e.g., a ratio of 1:1 or 2:1). Other useful combinations of fenugreek includes psyllium, cactus, and okra in equal ratios (e.g., 1:1:1:1).

In the above methods, the quantity of the plant polysaccharide agent is from about 0.005 g agent/L aqueous suspension to about 1 g agent/L aqueous suspension. In certain embodiments, the quantity of plant polysaccharide agent is about 0.5 g agent/L aqueous suspension.

In certain embodiments of the above methods, contacting an aqueous suspension of solids with a quantity of a plant polysaccharide agent further comprises contacting with a tamarind gum.

The methods of the invention are useful for removing solids from aqueous suspensions, such as wastewaters. In certain embodiments, aqueous suspensions that are advantageously treated include tannery waste, municipal wastewater, sewage, textile waste, drinking water, electrochemical waste, biodigestate waste, agricultural waste, brewery waste, dairy waste, surface water, ground water, storm water runoff, and anaerobic digestate.

In the methods, the removed solids can be suspended solids or total dissolved solids. In certain embodiments, the removed solids include comprise metals (e.g., chromium). In certain embodiments, the removed solids include nutrients (e.g., phosphate, nitrate, sulfate, and ammonium).

In other embodiments, the removed solids include microorganisms (e.g., E. coli). In these methods, disc diffusion and tube settling can be utilized in the solids separation step. In a representative example, 0.050 mL of 0.05 g/10 mL polymer solution (polysaccharide agent) was effective for flocculating E. coli (colony sizes 103-106 (250 µg/L treated liquid containing 1,000 to 1,000,000 bacteria). Representative useful polysaccharide agents include combination extracts of psyllium, cactus, okra, and fenugreek extracts; and combination extracts.

In the methods of the invention, the time required to achieve effective flocculation is greatly reduced compared to other methods. Typically, maximum settling is complete within 5 minutes. Effective polysaccharide agent combinations include psyllium, cactus, and okra; and psyllium and cactus. The optimum polysaccharide agent (polymer) dose was found to be 1 g/L with all the ratios found to be 1:1:1 and 1:1 respectively. Both solid polymer additions as well as solution polymer additions (e.g. aqueous suspensions or emulsion) of the polysaccharide extracts were used for the treatment in various combinations.

Compositions for Removing Solids from Aqueous Suspensions

In another aspect, the invention provides compositions useful for removing solids from an aqueous suspension of solid.

In one embodiment, the composition includes (a) a fenugreek extract (e.g., obtained by ethanol precipitation from an aqueous fenugreek solution); and (b) one or more plant polysaccharide extracts (e.g., obtained by ethanol precipitation from an aqueous plant polysaccharide solution), wherein the ratio of fenugreek extract to the one or more plant polysaccharide extracts is from about 0.5 to 2.0 based on dry weight.

In one embodiment, the ratio of the fenugreek extract to the one or more plant polysaccharide extracts is about 1:1 based on dry weight. In another embodiment, the ratio of the fenugreek extract to the one or more plant polysaccharide extracts is about 2:1 based on dry weight. In certain embodiments, the one or more plant polysaccharide extracts are selected from cactus, okra, aloe, chia, psyllium, or tamarind extracts.

In one embodiment, the composition further includes a tamarind gum.

In one embodiment, the composition includes (a) a fenugreek extract (e.g., obtained by ethanol precipitation from an aqueous fenugreek solution); and (b) a tamarind gum or a tamarind extract (e.g., obtained by ethanol precipitation from an aqueous tamarind solution).

In certain embodiments, the ratio of the fenugreek extract to the tamarind gum or tamarind extract is from about 0.5 to 2.0 based on dry weight. In one embodiment, the ratio of the fenugreek extract to the tamarind gum or tamarind extract is about 1:1 based on dry weight. In another embodiment, the ratio of the fenugreek extract to the tamarind gum or tamarind extract is about 2:1 based on dry weight.

In certain embodiments, the mixture of polymers works best when they are mixed together at the desired concentration and ratio in advance of adding to the water sample to be treated.

The following examples are provided for the purpose of illustrating, not limiting the claimed invention.

EXAMPLES

Example 1

Extraction/Precipitation Processes for Producing Representative Plant Polysaccharide Agents Representative plant polysaccharide agents of the invention can be obtained by extraction/precipitation of raw materials such as those described above. The following is a representative method for producing polysaccharide agents of the invention.

Weighed quantities of raw materials (e.g., seeds of fenugreek and chia, fruits of okra, cladodes of cactus, leaves of aloe vera and psyllium husks) were soaked overnight in distilled water. The solution is then blended in the blender followed by filtration to remove the solids. The filtrate was then treated with ethanol (90%-100%) with ethanol in the ratio of 1:3 to precipitate the desired polysaccharides. These precipitated polysaccharides were further purified using acetone as solvent. The wet polysaccharides were then dried in the oven at around 50-90° C. The dry polysaccharides were weighed and stored in a refrigerator. The dried polysaccharides have long shelf life. Table 1 summarizes the approximate % yield of the above extractive method.

TABLE 1

Extractive Yields.

| Name | Yield (%) | Yield (w/w) |
|---|---|---|
| Fenugreek | 31 | 310 g/kg |
| Okra | 1.6 | 16 g/kg |
| Psyllium | 25 | 250 g/kg |
| Cactus | 0.8 | 8 g/kg |
| Aloe vera | 1.6 | 16 g/kg |
| Chia | 4.5 | 45 g/kg |

Polysaccharide Extract/Precipitate Characterization

The polysaccharides obtained by extraction/precipitation as described above were further characterized by FTIR, HPLC, SEC, and NMR. The type of composition and linkage was analyzed using composition and linkage analysis.

Fenugreek Polysaccharide. Based on the linkage analysis, 1D, 2D NMR, and SEC, the sample was mainly composed of 4,6-linked β Man p and terminally linked α-Galp in 1:1 ratios. SEC analysis also revealed that it has two active components having molecular weights 20 kD and 167 kD. Composition analysis using HPLC showed that it is mainly composed of mannose and galactose.

The structure based on the analysis is shown below.

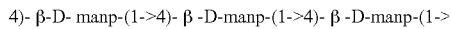

4)- β-D- manp-(1->4)- β -D-manp-(1->4)- β -D-manp-(1->

6

↑

1

α-D-galp

Example 2

Representative Methods for Using Polysaccharide Agents

In this example, representative methods of the invention using plant polysaccharide agents, prepared as described above, as flocculants/adsorbents to remove solids from various wastewater samples are described.

Batch experiments were conducted to evaluate the flocculation efficiencies of the plant polysaccharide agents compared to commercially available polymers.

Water samples used for the experiments were collected from Columbia Boulevard, Portland, Oreg. (biogas digestate). The water samples were municipal wastewater samples and food waste water samples. The concentration of the solids in the samples ranged from 1330 mg/L to 8390 mg/L.

Commercially available flocculants used in the comparison included Polydyne® dry polymer at the dose rate of 0.57% of the sludge (25 lbs of polymer/dry ton of solids). The commercial emulsion used was a polyacrylamide emulsion (Pfaltz and Bauer, CAS No. 9003-05-8).

Dry polymers and their solutions derived from plant polysaccharides were used in various combination and the doses. The contact times used varied from immediately to 30 minutes.

The make down ratio of all the polymers was 0.5 g in 100 mL. Desired volume was then used based on the concentration per experiment. The concentrations were varied from 0.001 g to 1 g/L. Commercially available biopolymers guar gum, chitosan, and tamarind were also used to study their flocculation efficiencies as compared to the plant polysaccharide agents (like fenugreek, okra, psyllium, cactus, aloe vera, and chia gums. The flocculation efficiencies were also compared with the synthetic flocculants currently used. In the solid polymer experiments, the synthetic flocculant used was Polydyne®. In the polymer solution experiments, the synthetic polymer used was polyacrylamide.

Flocculation is an agent-induced aggregation of particles suspended in liquid media into larger particles called 'flocs'. Flocculation is a destabilization process of a stable colloidal dispersion caused by addition of a chemical referred to as flocculant. The material and the chemical used for destabilization of colloidal particles in suspensions are called flocculants. In the experiments, the amount of solid present initially and at varying times was measured to provide information on how much solid can be flocculated at various times.

Settling is the measure of settling depth as a function of polymer concentration at variable times.

One proposed mechanism for flocculating and settling is bridging. When polymers (e.g., plant polysaccharide agents) are absorbed onto the surface of a particle in an aqueous phase, the polymers tend to form loops that extend from the particle surface into the aqueous phase. Adsorbed polymer may also have ends that extend from the polymer surface into the aqueous phase. These loops and ends can come into contact with and attach to additional particles to form bridges between particles.

Flocculation Method. Jar test experiments were conducted using varying concentrations of the flocculants individually and in different ratios to achieve maximum efficiency at optimal concentrations. The polysaccharide concentrations ranged from 25 mg/L to 1000 mg/L. Various ratios of polysaccharides were used for the experiments ranged from 1:1 to 1:5 of different polysaccharides. Combinations included from two to four polysaccharides in various ratios. In the methods, 500 mL of water samples were placed in the 1000 mL beakers. The polysaccharides were used as solids or were made into solutions.

Solids. The dried purified solids were crushed into fine powder and required amount was weighed and placed directly into the beakers containing the water sample. The flocculators were allowed to run for a minute at 100 rpm. The flocculators were stopped and solids were allowed to settle. Settling was measured in centimeters (cm) at various contact times (i.e., immediately when the solids were added): 1 minute, 5 minutes, 15 minutes, and 30 minutes. To determine the amount of solids that were removed, 20-30 mL of the samples were collected from the top in the pre-weighed beakers. The difference in the weight between the empty and the beakers with the flocculants were used to calculate the amount of solids removed at various time intervals. The % removal was compared with the controls and commercial flocculants.

Solutions. 0.5 g of dried polysaccharides were weighed and dissolved in distilled water using magnetic stirrer for 30-40 minutes to form a homogenous solution and to activate the polysaccharides. Desired volume of the solutions was pipetted to the beakers with 500 mL of water samples. The method described above for solids was repeated with the same contact times to calculate the settling time and the solids.

Flocculators are commercially available instruments commonly used in water treatment plants. The flocculator used in the present study is designated PB-700™ Jar Tester commercially available from Phipps and Bird™.

Plots showing the solid removal efficiencies for the polysaccharide agents of the invention compared to controls and commercially available polymers are shown in FIGS. 1-19. Results for solid polymer additions are shown in FIGS. 1-5 and results for solution polymer (e.g., emulsion) additions are shown in FIGS. 6, 7, and 9-19. The controls were untreated water samples (e.g., municipal wastewater from Portland Oreg., Dallas Tex., or Stephenville Tex.; biogas digestate).

In the tests, the concentration of the polysaccharides was varied from 10 mg/L to 1 g/L. In certain embodiments, 1 g agent/L proved to be an optimum concentration for removal of suspended solids within 30 sec to 1 min. One preferred combination for optimal suspended solid removal is a combination of fenugreek and okra in 1:1 (w/w) ratio. The combination was effective to remove about 85% of solids within a minute, which is comparable to commercially available flocculant.

Regarding polymer concentration for flocculation, a preferred combination is psyllium, cactus, and fenugreek in 1:1:1 ratio, which achieved about 98% removal of solids in 5 minutes.

A preferred plant polysaccharide agent is a fenugreek agent based on flocculation time, efficiency, and cost-effective based on its yield from its raw material. When compared to guar gum and tamarind, fenugreek showed increased flocculation efficiency at shorter contact time.

Example 3

Representative Methods for Using Polysaccharide Agents: Centrifugation

In this example, representative methods of the invention using plant polysaccharide agents, prepared as described above, as flocculants/adsorbents to remove solids from various wastewater samples are described. These methods include a centrifugation step.

In these experiments, the effect of the use of a centrifuge at variable speeds on flocculation efficiencies of plant polysaccharide agents on suspended solid settling at short contact times was evaluated.

Water samples for the experiments were collected from the Trinity wastewater plant located in Dallas, Tex. (biogas digestate). All the samples were used without dilution. The Trinity wastewater samples had total suspended solids of 855 mg/L, total dissolved solids of 770 mg/L, pH of 7.57 at 22.5° C., and turbidity of 202 NTU.

Plant Polysaccharide Agents. Solutions of fenugreek and tamarind were used in two different doses 0.5 g/L and 1 g/L, individually and in combination. The contact times used varied from immediately to 15 minutes.

Tamarind gum is commercially available from VWR (CAS 39386-78-2) and is manufactured by Tokyo Chemical Industry. Tamarind gum can be obtained from tamarind seed. In certain embodiments, tamarind is extracted from its seeds using the same method (e.g., ethanol precipitation method) as described for the plant polysaccharides agents of the invention. *Tamarindus indica* mucilage is a natural polysaccharide composed of D-galactose, D-glucose and D-xylose.

Polyacrylamide. Solutions of polyacrylamide (Pfaltz and Bauer, CAS No. 9003-05-8) at two different doses (0.5 g/L and 1 g/L) were used.

The make down ratio of the polymers was 0.5 g in 100 mL.

Settling experiments were conducting using a centrifuge. Biodegradability of the plant polysaccharide agents using viscosity experiments Procedure. A total volume 50 mL of the samples was taken in 50 mL centrifuge tube without any dilution. Desired volume of polymer solutions was added to the tube. The centrifuge speed was set to one speed at a time for all the samples and the doses including controls. The centrifuge speed ranged from 1000 RPM to 4000 RPM. After the prescribed time the tubes were removed from the centrifuge, the supernatant was discarded, the settled solids were transferred to pre-weighed beakers, and dried in an oven at about 105° C. The dried solids with the beaker were weighed after cooling to provide the amount of solids settling at different intervals of time.

Biodegradability and shelf life of the polymers were determined at room temperature, refrigerated temperature, and at 90° C.

Results. The fenugreek agent is stable at room temperature and requires from 4-15 days to completely degrade in the solution form. Refrigerated solutions are stable for more than a month. At higher temperature, solutions are stable for about 25 days.

Centrifuge Experiments. Plant polysaccharide agent flocculation and settling efficiencies were compared with polyacrylamide at varied centrifuge speed and time. Polymer doses were 0.5 g/L and 1 g/L. Doses for all the polymer samples including polyacrylamide were the same.

The greater the centrifuge speed, the greater the settling. All samples were undiluted and all the experiments performed at the pH of the samples i.e. (Trinity samples had a pH of about 6 and food waste samples had a pH of about 7). Settling was done without additional coagulant.

Plots showing the solid removal efficiencies for the polysaccharide agents of the invention compared to controls and a commercially available polymer (i.e., polyacrylamide) are shown in FIGS. 20-29. The controls were untreated water samples collected from the Trinity wastewater plant located in Dallas, Tex. (biogas digestate).

Figure 30:
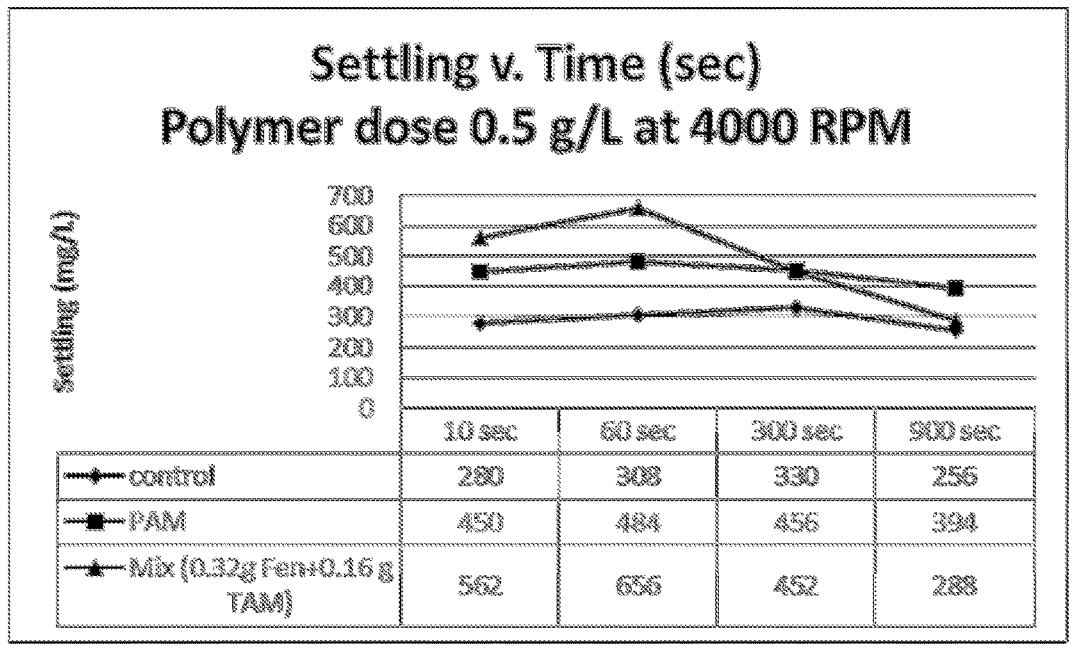
FIG. 30 is a plot showing settling of solids (municipal wastewater collected from Stephenville, Tex.) as a function of time (10, 60, 300 and 900 seconds) for a polysaccharide agent of the invention derived from fenugreek and tamarind (Mix (0.32 g Fen+0.16 g TAM)) in the ratio 2:1, and polyacrylamide (PAM), compared to control, at a dose of 0.5 g/L. Centrifuge 4000 rpm.
Figure 31:
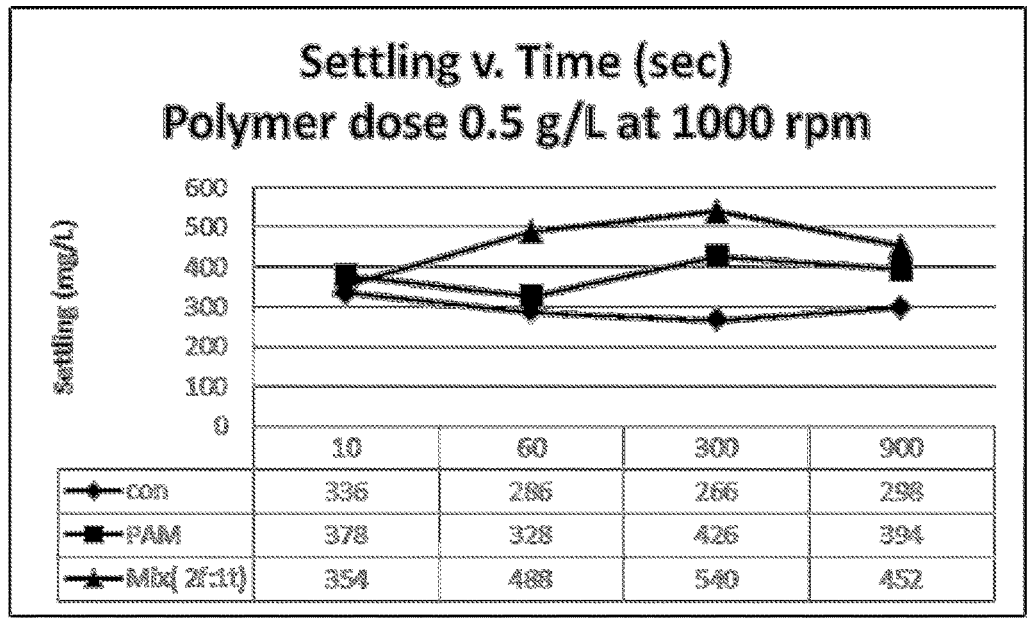
FIG. 31 is a plot showing settling of solids (municipal waste water collected from Stephenville, Tx.) as a function of time (10, 60, 300 and 900 seconds) for a polysaccharide agent of the invention derived from fenugreek and tamarind (Mix (2f:1t) in the ratio 2:1, and polyacrylamide (PAM), compared to control, at a dose of 0.5 g/L. Centrifuge 1000 rpm.
Figure 32:
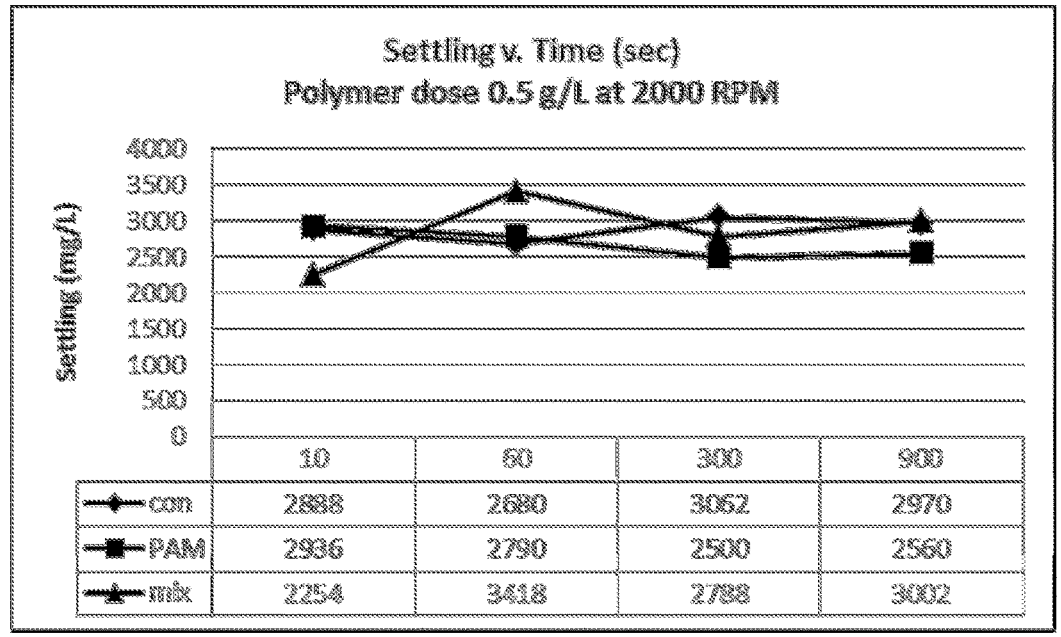
FIG. 32 is a plot showing settling of solids (food waste collected from Biogas digestate) as a function of time (10, 60, 300 and 900 seconds) for a polysaccharide agent of the invention derived from fenugreek and tamarind (mix) in the ratio 1:1, and polyacrylamide (PAM), compared to control, at a dose of 0.5 g/L. Centrifuge 2000 rpm.
Figure 33:
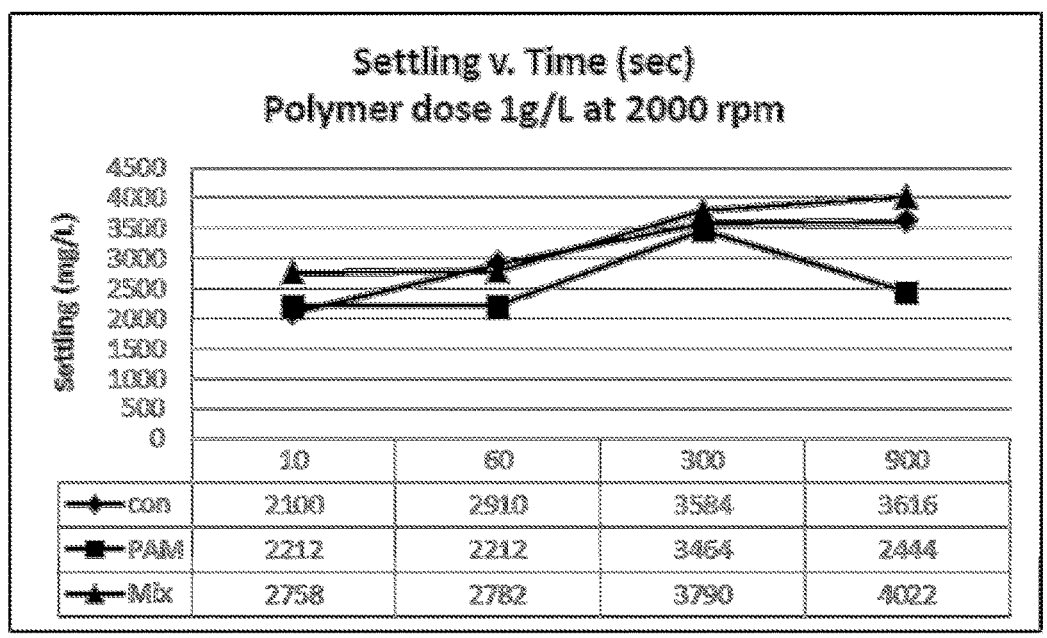
FIG. 33 is a plot showing settling of solids (municipal wastewater collected from Stephenville, Tex.) as a function of time (10, 60, 300 and 900 seconds) for a polysaccharide agent of the invention derived from fenugreek and tamarind (Mix) in the ratio 1:1, and polyacrylamide (PAM), compared to control, at a dose of 1 g/L. Centrifuge 2000 rpm.

Plots showing the solid removal efficiencies for the polysaccharide agents of the invention (fenugreek and tamarind at ratios of 1:1 and 2:1 by weight) compared to controls and a commercially available polymer (i.e., polyacrylamide) are shown in FIGS. 30-33. FIGS. 30, 31, and 33 show results for municipal wastewater from Stephenville, Tex. and FIG. 33 shows results for food waste collected from biogas digestate (Dallas, Tex.) (controls were untreated water samples).

While illustrative embodiments have been illustrated and described, it will be appreciated that various changes can be made therein without departing from the spirit and scope of the invention.

The embodiments of the invention in which an exclusive property or privilege is claimed are defined as follows:

1. A method for removing solids from an aqueous suspension of solids, comprising,
    contacting an aqueous suspension of solids with a quantity of a plant polysaccharide agent for a period of time sufficient to flocculate a portion of the solids to provide a suspension comprising flocculated solids, wherein the plant polysaccharide agent is an extract of two or more of cactus, okra, fenugreek, aloe, chia, psyllium, or tamarind extracts, and
    mechanically dewatering the suspension comprising flocculated solids to provide separated solids and an aqueous supernate.

2. The method of claim 1, wherein the plant polysaccharide agent comprises fenugreek extract.

3. The method of claim 1, wherein the quantity of the plant polysaccharide agent is from about 0.005 g agent/L aqueous suspension to about 1 g agent/L aqueous suspension.

4. The method of claim 1, wherein the quantity of plant polysaccharide agent is about 0.5 g agent/L aqueous suspension.

5. The method of claim 1, wherein the plant polysaccharide agent comprises tamarind gum.

6. The method of claim 1, wherein the aqueous suspension is tannery waste, municipal wastewater, sewage, textile waste, drinking water, electrochemical waste, biodigestate waste, agricultural waste, brewery waste, dairy waste, surface water, ground water, storm water runoff, or anaerobic digestate.

7. The method of claim 1, wherein the separated solids comprise suspended solids or total dissolved solids.

8. The method of claim 1, wherein the separated solids comprise metals.

9. The method of claim 1, wherein the separated solids comprise one or more of a phosphate, a nitrate, a sulfate, or an ammonium nutrient.

10. The method of claim 1, wherein the separated solids comprise microorganisms.

11. The method of claim 1, wherein the plant polysaccharide agent comprises:
    (a) a polysaccharide isolated from fenugreek seeds by ethanol extraction of a filtrate or a solution derived from fenugreek seeds; and
    (b) one or more of the remaining plant polysaccharide extracts,
    wherein the ratio of the polysaccharide from fenugreek seeds to the one or more remaining plant polysaccharide extracts is from 0.5 to 2.0 based on dry weight.

12. The method of claim 11, wherein the polysaccharide isolated from fenugreek seeds comprises 4,6-linked β-Manp and terminally linked α-Galp in 1:1 ratio.

13. A method for removing solids from an aqueous suspension of solids, comprising:
    contacting an aqueous suspension of solids having a first concentration of suspended solids with a quantity of a plant polysaccharide agent for a period of time sufficient to flocculate at least a portion of the solids to provide a suspension comprising flocculated solids, wherein the plant polysaccharide agent is an extract selected from fenugreek, cactus, okra, aloe, chia, psyllium, or tamarind extracts, and wherein the plant polysaccharide agent is a combination of two or more extracts including fenugreek extract; and
    removing at least a portion of the flocculated solids from the suspension comprising flocculated solids to provide an aqueous medium having a second concentration of suspended solids, wherein the first concentration is greater than the second concentration.

14. The method of claim 13, wherein contacting an aqueous suspension of solids with a quantity of a plant polysaccharide agent further comprises contacting with tamarind gum.

15. The method of claim 13, wherein the polysaccharide agent comprises:
    (a) a polysaccharide isolated from fenugreek seeds by ethanol extraction of a filtrate or a solution derived from fenugreek seeds; and
    (b) one or more plant polysaccharide extracts, wherein the ratio of the polysaccharide from fenugreek seeds to the one or more plant polysaccharide extracts is from 0.5 to 2.0 based on dry weight.

16. The method of claim 15, wherein the polysaccharide isolated from fenugreek seeds comprises 4,6-linked β-Manp and terminally linked α-Galp in 1:1 ratio.

17. A method for removing solids from an aqueous suspension of solids, comprising:

contacting an aqueous suspension of solids having a first concentration of suspended solids with a quantity of a plant polysaccharide agent for a period of time sufficient to flocculate at least a portion of the solids to provide a suspension comprising flocculated solids, wherein the plant polysaccharide agent is an extract selected from fenugreek, cactus, okra, aloe, chia, psyllium, or tamarind extracts, wherein the polysaccharide agent comprises:

(a) a polysaccharide isolated from fenugreek seeds by ethanol extraction of a filtrate or a solution derived from fenugreek seeds; and (b) one or more of the remaining plant polysaccharide extracts, wherein the ratio of the polysaccharide from fenugreek seeds to the one or more remaining plant polysaccharide extracts is from 0.5 to 2.0 based on dry weight; and removing at least a portion of the flocculated solids from the suspension comprising flocculated solids to provide an aqueous medium having a second concentration of suspended solids, wherein the first concentration is greater than the second concentration.

\* \* \* \* \*